(12) United States Patent
Bahr et al.

(10) Patent No.: US 11,513,058 B2
(45) Date of Patent: Nov. 29, 2022

(54) METHODS FOR MODULATING AN INTENSITY PROFILE OF A LASER BEAM AND SYSTEMS FOR SAME

(71) Applicant: Becton, Dickinson and Company, Franklin Lakes, NJ (US)

(72) Inventors: Matthew Bahr, Fremont, CA (US); Keegan Owsley, Campbell, CA (US); Jizuo Zou, San Jose, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 82 days.

(21) Appl. No.: 17/313,457

(22) Filed: May 6, 2021

(65) Prior Publication Data
US 2021/0364413 A1    Nov. 25, 2021

Related U.S. Application Data

(60) Provisional application No. 63/027,080, filed on May 19, 2020.

(51) Int. Cl.
G01N 15/14    (2006.01)
G01N 15/10    (2006.01)

(52) U.S. Cl.
CPC . *G01N 15/1459* (2013.01); *G01N 2015/1006* (2013.01); *G01N 2015/1438* (2013.01)

(58) Field of Classification Search
CPC ........... G01N 15/1459; G01N 15/1425; G01N 15/1434
See application file for complete search history.

(56) References Cited

U.S. PATENT DOCUMENTS 4,545,677 A    10/1985    Chupp
4,883,656 A    11/1989    Konrad et al.
(Continued)

FOREIGN PATENT DOCUMENTS

CN    101035647    9/2007
CN    102667445    9/2012
(Continued)

OTHER PUBLICATIONS

Bertero et al. "Iterative image reconstruction: a point of view," Proceedings of the Interdisciplinary Workshop on Mathematical Methods in Biomedical Imaging and Intensity-Modulated Radiation Therapy (IMRT), Oct. 31, 2007, pp. 1-25. Retrieved from the Internet: URL:http://homes.di.unimi.it/borghese|Teaching|intellige ntSystems|Documents|Symbolic/07.Bertero.paper.pdf.
(Continued)

*Primary Examiner* — Rebecca C Bryant
(74) *Attorney, Agent, or Firm* — Bret E. Field; Bozicevic, Field & Francis LLP

(57) ABSTRACT

Aspects of the present disclosure include methods for modulating an intensity profile of a laser beam. Methods according to certain embodiments include irradiating an acousto-optic device with a laser to generate an output laser beam having a plurality of angularly deflected laser beams, capturing an image of the output laser beam, determining an intensity profile of the output laser beam along a horizontal axis from the captured image and adjusting one or more parameters of a waveform inputted into the acousto-optic device in response to the determined intensity profile to generate an output laser beam having a modulated intensity profile. Systems having a laser, an acousto-optic device, an imaging sensor and a waveform generator as well as non-transitory computer readable storage medium with instructions for practicing the subject methods are also described.

20 Claims, 9 Drawing Sheets

(56) References Cited

U.S. PATENT DOCUMENTS

| | | |
|---|---|---|
| 5,111,332 A | 5/1992 | Kuwabara et al. |
| 5,192,870 A | 3/1993 | Batchelder et al. |
| 5,255,257 A | 10/1993 | Bryant et al. |
| 5,270,548 A | 12/1993 | Steinkamp |
| 5,293,213 A | 3/1994 | Klein et al. |
| 5,296,911 A | 3/1994 | Weyrauch et al. |
| 5,485,530 A | 1/1996 | Lakowicz et al. |
| 5,489,977 A | 2/1996 | Winslow et al. |
| 5,504,337 A | 4/1996 | Lakowicz et al. |
| 5,768,010 A | 6/1998 | Iwamoto |
| 5,968,738 A | 10/1999 | Anderson et al. |
| 6,016,196 A | 1/2000 | Mermelstein |
| 6,057,814 A | 5/2000 | Kalt |
| 6,236,454 B1 | 5/2001 | Almogy |
| 6,252,669 B1 | 6/2001 | Drabarek |
| 6,271,924 B1 | 8/2001 | Ngoi et al. |
| 6,297,884 B1 | 10/2001 | Drabarek |
| 6,396,069 B1 | 5/2002 | Macpherson et al. |
| 6,592,822 B1 | 7/2003 | Chandler |
| 6,642,018 B1 | 11/2003 | Koller et al. |
| 6,867,899 B2 | 3/2005 | Knebel |
| 7,400,457 B1 | 7/2008 | Cayer |
| 7,561,264 B2 | 7/2009 | Luo et al. |
| 7,630,063 B2 | 12/2009 | Padmanabhan et al. |
| 7,724,426 B2 | 5/2010 | Yamashita et al. |
| 7,803,624 B2 | 9/2010 | Klautky et al. |
| 7,889,348 B2 | 2/2011 | Tearney et al. |
| 8,101,426 B2 | 1/2012 | Durack et al. |
| 8,184,279 B2 | 5/2012 | Feldkhun |
| 8,253,938 B2 | 8/2012 | Vacca et al. |
| 8,330,124 B2 | 12/2012 | Doi et al. |
| 8,440,952 B2 | 5/2013 | Jalali et al. |
| 8,772,039 B2 | 7/2014 | Nadkami et al. |
| 9,201,011 B2 | 12/2015 | Kalkbrenner et al. |
| 9,423,353 B2 | 8/2016 | Diebold et al. |
| 9,784,661 B2 | 10/2017 | Jalali |
| 10,006,852 B2 | 6/2018 | Jalali et al. |
| 10,036,699 B2 | 7/2018 | Jalali |
| 10,288,546 B2 * | 5/2019 | Diebold ............. G01N 15/1434 |
| 2003/0031352 A1 | 2/2003 | Nelson et al. |
| 2003/0226977 A1 | 12/2003 | Storz et al. |
| 2004/0061853 A1 | 4/2004 | Blasenheim |
| 2005/0081245 A1 | 4/2005 | Arad et al. |
| 2005/0121603 A1 | 6/2005 | Seyfried et al. |
| 2005/0207633 A1 | 9/2005 | Arini |
| 2005/0207940 A1 | 9/2005 | Butler et al. |
| 2005/0279808 A1 | 12/2005 | Johnson |
| 2006/0014212 A1 | 1/2006 | Benkovic et al. |
| 2008/0129298 A1 | 6/2008 | Vaughan et al. |
| 2008/0285606 A1 | 11/2008 | Kippenberg et al. |
| 2009/0237289 A1 | 9/2009 | Stoddard |
| 2009/0323061 A1 | 12/2009 | Novotny et al. |
| 2010/0210952 A1 | 8/2010 | Taira et al. |
| 2010/0233676 A1 | 9/2010 | Kelly et al. |
| 2010/0301024 A1 | 12/2010 | Unrath |
| 2011/0192991 A1 | 8/2011 | Fukumoto et al. |
| 2011/0275558 A1 | 11/2011 | Bassaganya-Riera |
| 2011/0031791 A1 | 12/2011 | Suzuki |
| 2012/0001090 A1 | 1/2012 | Takasaki et al. |
| 2012/0128264 A1 | 5/2012 | Yazdanfar et al. |
| 2012/0225418 A1 | 9/2012 | Meyer et al. |
| 2012/0270306 A1 | 10/2012 | Vacca et al. |
| 2012/0294319 A1 | 11/2012 | Maleki et al. |
| 2012/0307244 A1 | 12/2012 | Sharpe et al. |
| 2013/0078625 A1 | 3/2013 | Holmes |
| 2013/0323825 A1 | 12/2013 | Sekino |
| 2013/0335740 A1 | 12/2013 | Ishimaru |
| 2015/0177133 A1 | 6/2015 | Choi et al. |
| 2015/0182136 A1 | 7/2015 | Durduran et al. |
| 2015/0219732 A1 | 8/2015 | Diamond et al. |
| 2016/0003741 A1 | 1/2016 | Diebold et al. |
| 2016/0118763 A1 | 4/2016 | Gao |
| 2016/0178345 A1 | 6/2016 | Kilpatrick et al. |
| 2017/0100041 A1 | 4/2017 | Kasamatsu et al. |
| 2017/0102314 A1 | 4/2017 | Diebold et al. |
| 2017/0138857 A1 | 5/2017 | Diebold et al. |
| 2017/0227444 A1 | 8/2017 | Jalai et al. |
| 2017/0242232 A1 | 8/2017 | Leger et al. |
| 2017/0254784 A1 | 9/2017 | Murayama |
| 2017/0268981 A1 | 9/2017 | Diebold et al. |
| 2017/0328826 A1 | 11/2017 | Diebold et al. |
| 2017/0350803 A1 | 12/2017 | Jalali et al. |
| 2019/0204208 A1 | 7/2019 | Diebold et al. |
| 2021/0404943 A1 * | 12/2021 | Zou ................... G01N 15/1436 |

FOREIGN PATENT DOCUMENTS

| | | |
|---|---|---|
| DE | 102010044013 A1 | 5/2012 |
| JP | H10148778 A | 6/1998 |
| JP | 11-6719 A | 1/1999 |
| JP | 2002296178 | 10/2002 |
| JP | 2007285999 A | 11/2007 |
| JP | 20089395 A | 1/2008 |
| JP | 200920492 A | 1/2009 |
| JP | 2009-509684 A | 3/2009 |
| JP | 2009109197 | 5/2009 |
| JP | 2011-158413 A | 8/2011 |
| JP | 2011-191496 A | 9/2011 |
| JP | 6257172 | 1/2014 |
| JP | 2015038922 A | 2/2015 |
| JP | 2015152593 | 8/2015 |
| JP | 2016224241 A | 12/2016 |
| WO | WO 93/09423 A1 | 5/1993 |
| WO | WO 03/029882 A2 | 4/2003 |
| WO | WO 2007/041412 A1 | 4/2007 |
| WO | WO 2007/066126 A1 | 6/2007 |
| WO | WO 2009087392 A1 | 7/2009 |
| WO | WO 2011/023593 A1 | 3/2011 |
| WO | WO 2012/127907 A1 | 9/2012 |
| WO | WO 2014110290 A1 | 7/2014 |
| WO | WO 2014/152048 A2 | 9/2014 |
| WO | WO 2015/143041 A1 | 9/2015 |
| WO | WO 2016054293 A1 | 4/2016 |
| WO | WO 2016075681 A1 | 5/2016 |
| WO | WO 2017066404 A1 | 4/2017 |
| WO | WO 2017161247 A1 | 9/2017 |

OTHER PUBLICATIONS

Diebold et al. "Digitally synthesized beat frequency multiplexing for sub-millisecond fluorescence microscopy," Nature Photonics, Oct. 2013, vol. 7, No. 10, pp. 806-810, published online Sep. 22, 2013.

Digman et al. "Fluorescence correlation spectroscopy and fluorescence cross-correlation spectroscopy," Wiley Interdisciplinary Reviews, Systems Biology and Medicine, vol. 1, No. 2, Apr. 29, 2009, pp. 273-282.

Dutta et al. "Quantitative Statistical Methods for Image Quality Assessment," Theranostics, vol. 3, No. 10, Oct. 4, 2013, pp. 741-756.

Eisenstein, M. "Fluorescence microscopy gets a frequency boost", Nature Methods, Dec. 2013, vol. 10, No. 12, p. 1149.

Fessler, J. A. "Penalized weighted least-squares image reconstruction for positron emission tomography," IEEE Trans. Medical Imaging, vol. 13, No. 2, Jun. 1994, pp. 290-300.

Hanley et al. "Fluorescence lifetime imaging in an optically sectioning programmable array microscope (PAM)", Cytometry, Part A, vol. 67A, No. 2, Jan. 1, 2005, pp. 112-118.

Hoffman, Robert A. "Pulse Width for Particle Sizing," Current Protocols in Cytometry, 50, Unit 1.23, pp. 1.23.1-1.23.17 (Oct. 2009).

Sisan et al. "Event Ordering in Live-Cell Imaging Determined from Temporal Cross-Correlation Asymmetry," Biophysical Journal, vol. 98, No. 11, Jun. 1, 2010, pp. 2432-2441.

Subramaniam et al. "Photophysics of Green and Red Fluorescent Proteins: Implications for Quantitative Microscopy", Methods in Enzymology, vol. 360, Jan. 1, 2003, pp. 178-201.

Thews et al. "Cross Talk Free Fluorescence Cross Correlation Spectroscopy in Live Cells," Biophysical Journal, vol. 89, No. 3, Sep. 30, 2005, pp. 2069-2076.

(56) References Cited

OTHER PUBLICATIONS

Varma et al. "Fast image reconstruction for fluorescence microscopy," AIP Advances, vol. 2, No. 3, Sep. 17, 2012, pp. 32174-32174.
Wu et al. "Frequency Division Multiplexed Multichannel High-Speed Fluorescence Confocal Microscope," Biophysical Journal, vol. 91, Sep. 2006, pp. 2290-2296.
Notification of Reasons for Refusal for Japanese patent application No. 2016-556971, dated Nov. 22, 2018, 5 pages.
Scheres, "Relion: Implementation of a Bayesian approach to cryo-EM structure determination", Journal of Structural Biology, vol. 180, Issue 3, 2012, pp. 519-530.
Communication—The Extended European Search report for European application No. 17851348.7, dated Apr. 24, 2020, 10 pages.
Office Action dated Mar. 22, 2016 for U.S. Appl. No. 14/792,282, 14 pages.
International search Report and Written Opinion for PCT Application PCT/US2014/010928 dated May 1, 2014, 3 pages.
Bechtold, et al. "Beam shaping and high-speed, cylinder-lens-free beam guiding using acousto-optical deflectors without additional compensation optics", OSA Publishing > Optics Express > vol. 21 > Issue 12 > p. 14627.
Zhu, et al., "Detecting heterogeneity in single-cell RNA-Seq data by non-negative matrix factorization", PeerJ, vol. 5, e2888, pp. 1-20, 2017.

\* cited by examiner

METHODS FOR MODULATING AN INTENSITY PROFILE OF A LASER BEAM AND SYSTEMS FOR SAME

CROSS-REFERENCE

Pursuant to 35 U.S.C. § 119 (e), this application claims priority to the filing date of U.S. Provisional Patent Application Ser. No. 63/027,080 filed May 19, 2020, the disclosure of which application is incorporated herein by reference in its entirety.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. To quantify these variations, the light is collected and directed to the surface of a detector.

One technique that utilizes light detection to characterize the components in a sample is flow cytometry. Using data generated from the detected light, properties of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. Light from the light source can be detected as scatter or by transmission spectroscopy or can be absorbed by one or more components in the sample and re-emitted as luminescence.

SUMMARY

Aspects of the present disclosure include methods for modulating an intensity profile of a laser beam. Methods according to certain embodiments include irradiating an acousto-optic device with a laser to generate an output laser beam having a plurality of angularly deflected laser beams, capturing an image of the output laser beam, determining an intensity profile of the output laser beam along a horizontal axis from the captured image and adjusting one or more parameters of a waveform inputted into the acousto-optic device in response to the determined intensity profile to generate an output laser beam having a modulated intensity profile. Systems having a laser, an acousto-optic device, an imaging sensor and a waveform generator as well as non-transitory computer readable storage medium with instructions for practicing the subject methods are also described.

In practicing the subject methods, one or more parameters of a waveform inputted into an acousto-optic device is adjusted to modulate the intensity of the output laser beam. In some embodiments, methods include adjusting one or more tones that are inputted into the acousto-optic device. In some instances, the amplitudes of the tones are adjusted. In other instances, the frequencies of the tones are adjusted. In certain instances, each of the tones inputted into the acousto-optic device is formed from a sum of sine waves and methods include adjusting one or more parameters of the sine waves of each inputted tone. For instance, the frequency or the amplitude of the sine waves for each inputted tone may be adjusted.

In certain embodiments, methods include determining an amplitude of each angularly deflected laser beam in the output laser beam and adjusting one or more parameters of an inputted waveform into the acousto-optic device for each of the angularly deflected laser beams. In some instances, methods include determining the amplitude of each angularly deflected laser beam in the output laser beam and comparing each determined amplitude with a predetermined threshold intensity. In certain instances, methods include adjusting a parameter of the waveform inputted into the acousto-optic device for each of the angularly deflected laser beams that is determined to be below the predetermined threshold intensity. Where the intensity of the angularly deflected laser beam is determined to be below the predetermined threshold intensity, methods may include adjusting the frequency or amplitude of the tone of the waveform inputted into the acousto-optic device.

In some embodiments, methods include determining the intensity profile of the plurality of angularly deflected beams of light across a horizontal axis of the output laser beam. In some embodiments, the intensity profile is determined with a photodetector. In certain embodiments, an image of the output laser beam is captured, such as with an imaging sensor or a beam camera. In some instances, a plot of the intensity profile is generated, such as from a captured image of the output laser beam. In certain instances, methods include applying a predetermined threshold to the output laser beam intensity profile plot and identifying the angularly deflected beams that are below the applied predetermined threshold.

In some embodiments, methods include generating an output laser beam having a substantially constant intensity profile along a horizontal axis. In some instances, parameters of a waveform inputted into the acousto-optic device are adjusted for one or more of the angularly deflected laser beams in a manner sufficient to generate an output laser beam with a constant intensity profile. In certain instances, one or more parameters of the inputted waveform are adjusted to generate a plurality of angularly deflected laser beams having intensities which vary by 10% or less. In other instances, one or more parameters of the inputted waveform are adjusted to generate a plurality of angularly deflected laser beams having intensities which vary by 5% or less. In embodiments, each of the angularly deflected laser beams along the horizontal axis are spatially separated. In some instances, each angularly deflected laser beam at least partially overlaps with one other angularly deflected laser beam in the output laser beam.

Aspects of the present disclosure also include systems for modulating an intensity profile of a laser beam, where systems of interest (e.g., particle analyzers) include a laser, an acousto-optic device (e.g., an acousto-optic deflector), a photodetector, a waveform generator configured to input a waveform into the acousto-optic device to generate an output laser beam having a plurality of angularly deflected laser beams and a controller having a processor with memory operably coupled to the processor with instructions which when executed by the processor, cause the processor to determine an intensity profile of the output laser beam along a horizontal axis with the photodetector and adjust one or more parameters of a waveform inputted into the acousto-optic device in response to the determined intensity profile to generate an output laser beam having a modulated intensity profile.

In some embodiments, the photodetector is an imaging sensor or a camera and the memory includes instructions for capturing an image of the output laser beam and adjusting one or more parameters of the inputted waveform into the acousto-optic device based on the captured image of the output laser beam. In some instances, the memory includes instructions for generating an intensity profile plot of the plurality of angularly deflected beams of light across a horizontal axis of the output laser beam. In certain instances, the memory includes instructions for generating the intensity profile plot based on a captured image of the output laser beam. In some embodiments, the memory includes instructions for applying a predetermined threshold to the generated output laser beam intensity profile plot and identifying the angularly deflected beams that are below the applied predetermined threshold.

Systems of interest include a waveform generator for inputting a waveform into the acousto-optic device to generate a plurality of angularly deflected laser beams when irradiated by the laser. In some embodiments, the waveform generator is an Arbitrary Waveform Generator (AWG). In certain embodiments, the waveform generator is configured to input a waveform into the acousto-optic device to generate a local oscillator beam and a plurality of radiofrequency comb beams. In some instances, the plurality of radiofrequency comb beams are spatially separated. In certain instances, each angularly deflected laser beam at least partially overlaps with one other angularly deflected laser beam in the output laser beam.

In embodiments, one or more parameters of a waveform are adjusted with the waveform generator to modulate the intensity of the output laser beam. In some embodiments, the waveform generator is configured to adjust one or more tones of the waveform inputted into the acousto-optic device. In some instances, the waveform generator is configured to adjust an amplitude of the tones of the waveform inputted into the acousto-optic device. In other instances, the waveform generator is configured to adjust a frequency of the tones of the waveform inputted into the acousto-optic device.

In some embodiments, the waveform generator is configured to adjust one or more parameters of the inputted waveform for each angularly deflected laser beam generated by the laser-irradiated acousto-optic device. In certain embodiments, systems are configured to determine an amplitude of each angularly deflected laser beam in the output laser beam and adjust one or more parameters of an inputted waveform into the acousto-optic device for each of the angularly deflected laser beams. In some instances, the system is configured to determine the amplitude of each angularly deflected laser beam in the output laser beam and compare each determined amplitude with a predetermined threshold intensity. In certain instances, the waveform generator is configured to adjust a parameter of the waveform inputted into the acousto-optic device for each of the angularly deflected laser beams that is determined to be below the predetermined threshold intensity. Where the intensity of the angularly deflected laser beam is determined to be below the predetermined threshold intensity, the waveform generator may be configured to adjust the frequency or amplitude of the tone of the waveform inputted into the acousto-optic device.

In certain embodiments, systems are configured to generate an output laser beam having a substantially constant intensity profile along a horizontal axis. In some instances, the waveform generator is configured to adjust parameters of a waveform inputted into the acousto-optic device for one or more of the angularly deflected laser beams in a manner sufficient to generate an output laser beam with a constant intensity profile. In certain instances, the waveform generator adjusts one or more parameters of the inputted waveforms to generate a plurality of angularly deflected laser beams having intensities which vary by 10% or less. In other instances, the waveform generator adjusts one or more parameters of the inputted waveforms to generate a plurality of angularly deflected laser beams having intensities which vary by 5% or less. In some embodiments, the waveform generator adjusts one or more parameters of the inputted waveforms to generate an output laser beam having a top-hat beam profile.

Aspects of the present disclosure also include a non-transitory computer readable storage medium for modulating an output intensity profile of a laser in the subject systems. Non-transitory computer readable storage medium according to certain embodiments include instructions stored thereon having algorithm for irradiating an acousto-optic device with a laser to generate an output laser beam comprising a plurality of angularly deflected laser beams, algorithm for determining an intensity profile of the output laser beam along a horizontal axis from the captured image and algorithm for adjusting one or more parameters of a waveform inputted into the acousto-optic device in response to the determined intensity profile to generate an output laser beam having a modulated intensity profile.

In some embodiments, the non-transitory computer readable storage medium includes algorithm for adjusting one or more tones of the waveforms inputted into the acousto-optic device. In some instances, the non-transitory computer readable storage medium includes algorithm for adjusting the amplitude of the tones. In other instances, the non-transitory computer readable storage medium includes algorithm for adjusting the frequency of the tones. In certain instances, the non-transitory computer readable storage medium includes algorithm for determining an amplitude of each angularly deflected laser beam in the output laser beam and algorithm for adjusting one or more parameters of an inputted waveform into the acousto-optic device for each of the angularly deflected laser beams.

In some embodiments, the non-transitory computer readable storage medium includes algorithm for determining the amplitude of each angularly deflected laser beam in the output laser beam and algorithm for comparing each determined amplitude with a predetermined threshold intensity. In some instances, the non-transitory computer readable storage medium includes algorithm for identifying the angularly deflected laser beams having an intensity below the predetermined threshold intensity. In certain instances, the non-transitory computer readable storage medium includes algorithm for adjusting a parameter of the waveform inputted into the acousto-optic device for each of the angularly deflected laser beams that are determined to be below the predetermined threshold intensity. For example, the non-transitory computer readable storage medium may include algorithm for adjusting the frequency or amplitude of the tones of the waveform inputted into the acousto-optic device for each of the angularly deflected laser beams.

In some embodiments, the non-transitory computer readable storage medium includes algorithm for determining the intensity profile of the plurality of angularly deflected beams of light across a horizontal axis of the output laser beam. In some embodiments, the non-transitory computer readable storage medium includes algorithm for determining the intensity profile based on a data signal from a photodetector. In other embodiments, the non-transitory computer readable storage medium includes algorithm for capturing an image of the output laser beam such as with an imaging sensor or a beam camera. In some instances, the non-transitory computer readable storage medium includes algorithm for generating a plot of the intensity profile. In certain instances, the non-transitory computer readable storage medium includes algorithm for applying a predetermined threshold to the output laser beam intensity profile plot and algorithm for identifying the angularly deflected beams that are below the applied predetermined threshold.

In certain embodiments, the non-transitory computer readable storage medium includes algorithm for generating an output laser beam having a substantially constant intensity profile along a horizontal axis. In some instances, the non-transitory computer readable storage medium includes algorithm for adjusting parameters of a waveform inputted into the acousto-optic device for one or more of the angularly deflected laser beams and generating an output laser beam with a constant intensity profile. In certain instances, the non-transitory computer readable storage medium includes algorithm for adjusting one or more parameters of the inputted waveform to generate a plurality of angularly deflected laser beams having intensities which vary by 10% or less. In other instances, the non-transitory computer readable storage medium includes algorithm for adjusting one or more parameters of the inputted waveform to generate a plurality of angularly deflected laser beams having intensities which vary by 5% or less.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1A:
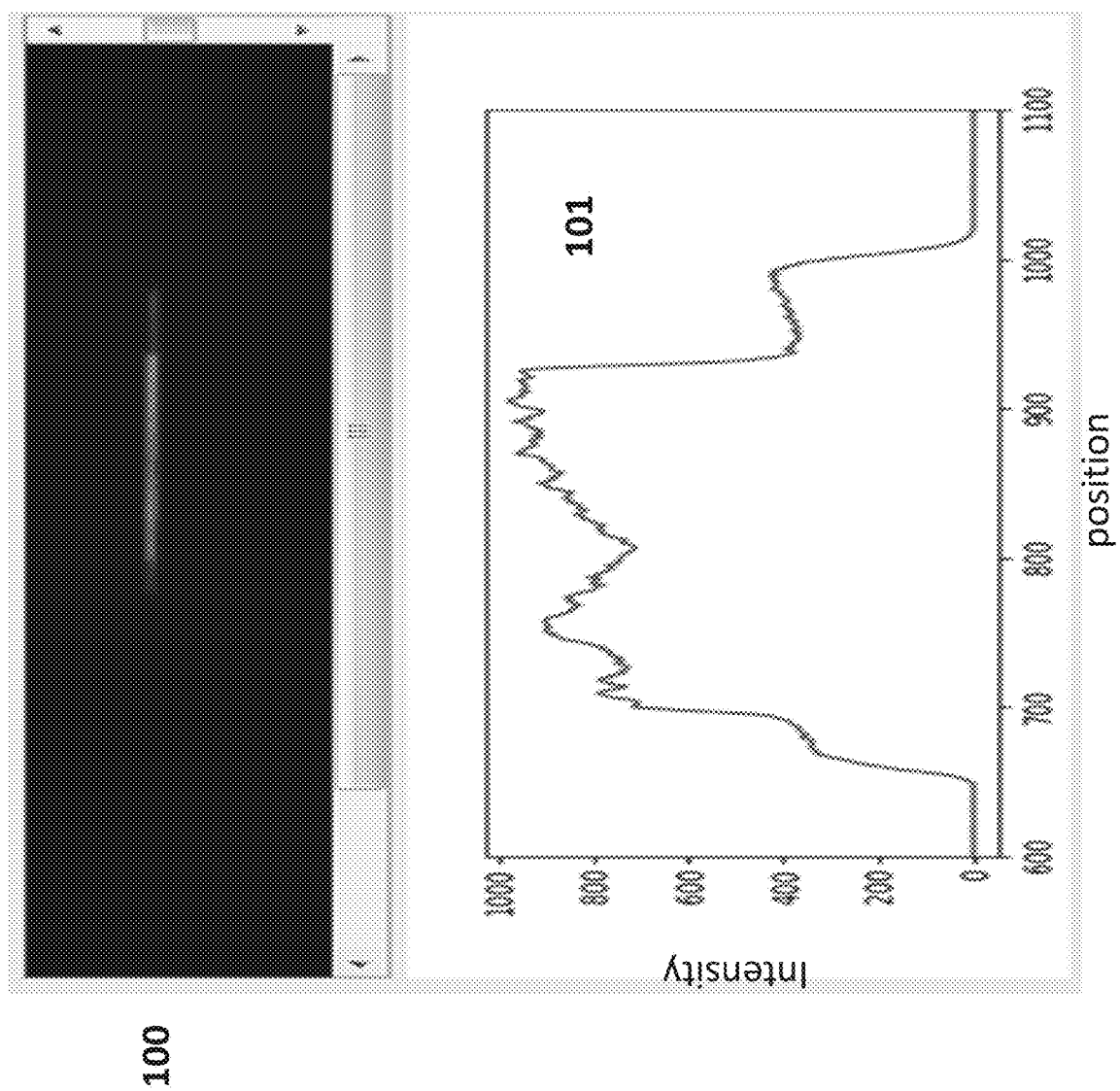
FIG. 1A depicts generating an intensity profile plot of an output laser beam having a plurality of angularly deflected laser beams according to certain embodiments.

Aspects of the present disclosure include methods for modulating an intensity profile of a laser beam. Methods according to certain embodiments include irradiating an acousto-optic device with a laser to generate an output laser beam having a plurality of angularly deflected laser beams, capturing an image of the output laser beam, determining an intensity profile of the output laser beam along a horizontal axis from the captured image and adjusting one or more parameters of a waveform inputted into the acousto-optic device in response to the determined intensity profile to generate an output laser beam having a modulated intensity profile. Systems having a laser, an acousto-optic device, an imaging sensor and a waveform generator as well as non-transitory computer readable storage medium with instructions for practicing the subject methods are also described.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for modulating an intensity profile of a laser beam. In further describing embodiments of the disclosure, methods for determining an intensity profile of an output laser beam having a plurality of angularly deflected laser beams and modulating the intensity profile along a horizontal axis are first described in greater detail. Next, systems for practicing the subject methods having a laser, an acousto-optic device, a laser beam detector, a waveform generator and a controller for adjusting a waveform parameter inputted into the acousto-optic device are also described. Non-transitory computer readable storage medium with instructions for practicing the subject methods and kits having one or more components of the subject systems are also provided.

Methods for Modulating an Output Laser Beam Having Angularly Deflected Laser Beams Aspects of the disclosure include methods for modulating an intensity profile of an output laser beam having a plurality of angularly deflected laser beams (e.g., for irradiating a sample in a flow stream). In practicing methods according to embodiments, an acousto-optic device is irradiated with a laser to generate a plurality of angularly deflected laser beams, determining an intensity profile of the output laser beam along a horizontal axis and adjusting one or more parameters of a waveform inputted into the acousto-optic device in response to the determined intensity profile to generate an output laser beam having a modulated intensity profile. As described in greater detail below, each angularly deflected laser beam is generated based on a waveform that is inputted into the acousto-optic device from a waveform generator. To modulate the intensity of each angularly deflected laser beam, one or more parameters of the inputted waveform may be adjusted as described herein. The term "angularly deflected laser beam" is used herein in its conventional sense to refer to laser beams that are produced via the interaction of acoustic waves in the acousto-optic device, produced by an applied radiofrequency drive signal, with the beam of light from the laser to produce one or more beamlets having a shift in optical frequency and a deflection in propagation angle.

In embodiments, methods include irradiating the acousto-optic device with a laser. Lasers of interest may include pulsed lasers or continuous wave lasers. The type and number of lasers used in the subject methods may vary and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the acousto-optic device with a dye laser, such as a stilbene, coumarin or rhodamine laser. In yet other instances, methods include irradiating the acousto-optic device with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the acousto-optic device with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulium YAG laser, ytterbium YAG laser, ytterbium$_2$O$_3$ laser or cerium doped lasers and combinations thereof. In still other instances, methods include irradiating the acousto-optic device with a semiconductor diode laser, optically pumped semiconductor laser (OPSL), or a frequency doubled- or frequency tripled implementation of any of the above mentioned lasers.

Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

Methods according to the present disclosure include inputting a waveform from a waveform generator (e.g., an Arbitrary Waveform Generator) for each angularly deflected laser beam to the acousto-optic device to generate the plurality of angularly deflected laser beams of the output laser beam. In practicing the subject methods, one or more waveforms may be generated and inputted into the acousto-optic device for each angularly deflected laser beam in the output beam, such as 2 or more, such as 3 or more, such as 4 or more, such as 5 or more, such as 10 or more, such as 15 or more, such as 25 or more, such as 50 or more and including inputting 100 or more waveforms into the acousto-optic device. In some embodiments, the inputted waveforms include one or more tones, such as 2 or more tones, such as 3 or more tones, such as 4 or more tones, such as 5 or more tones and including 10 or more tones. Each tone is, in certain instances, a sum of distinct sine waves, such as a sum of 2 or more distinct sine waves, such as 3 or more, such as 4 or more, such as 5 or more, such as 10 or more, such as 25 or more, such as 100 or more and including where each tone is a sum of 500 or more distinct sine waves.

In some embodiments, the angularly deflected laser beams produced by the inputted waveforms each have an intensity based on the amplitude of the tones of the waveform. In some embodiments, the tones of waveforms inputted into the acousto-optic device independently each have substantially the same amplitude, such as where the amplitude of the tones of waveforms inputted into the acousto-optic device vary from each other by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.1% or less and including by 0.01% or less. In some embodiments, the sine waves which form each tone have an amplitude which vary between tones by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.1% or less and including by 0.01% or less.

In practicing the subject methods, an intensity profile of the output laser beam is determined along a horizontal axis. The intensity profile of the output laser beam can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors. In some instance, to determine the intensity profile of an output beam of light, the relative intensity of each output laser beam of light is plotted as a function of the distance from the optical axis (along an orthogonal horizontal axis) of the output beam of light to determine the intensity profile at the point of irradiation. In certain embodiments, the deviation in relative intensity at predetermined distances from the optical axis is calculated to determine whether the beam profile of the output beam of light exhibits a substantially constant intensity from each edge to the center along the horizontal axis. In other embodiments, the deviation in relative intensity is calculated across the entire horizontal axis of the beam profile of the output beam of light to determine if the output beam of light exhibits a substantially constant intensity from the edge to the center.

In some embodiments, the intensity profile of the output laser beam is determined by capturing an image of the output laser beam. For instance, methods may include capturing 2 or more images of the output laser beam to determine the intensity profile of the output laser beam along a horizontal axis, such as 3 or more images, such as 4 or more images, such as 5 or more images, such as 6 or more images, such as 7 or more images, such as 8 or more images, such as 9 or more images, such as 10 or more images, such as 25 or more images, such as 50 or more images and including capturing 100 or more images of the output laser beam to determine the intensity profile of the output laser beam along a horizontal axis. Where more than one image is captured, the plurality of images may be automatically stitched together by a processor having digital image processing algorithm.

The image of the output laser beam may be captured with any suitable device capable of capturing and converting an optical image into an electronic data signal, including but not limited to charge-coupled devices, semiconductor charge-coupled devices (CCD), active pixel sensors (APS), complementary metal-oxide semiconductor (CMOS) image sensors or N-type metal-oxide semiconductor (NMOS) image sensors. In some embodiments, the imaging sensor is a CCD camera. For example, the camera may be an electron multiplying CCD (EMCCD) camera or an intensified CCD (ICCD) camera. In other embodiments, the imaging sensor is a CMOS-type camera.

Images of the output laser beam may captured with one or more imaging sensors. In some embodiments, the intensity profile of the output laser beam is captured with a combination of imaging sensors, such as with two or more imaging sensors, such as three or more imaging sensors, such as four or more imaging sensors and including five or more imaging sensors. Where more than one imaging sensor is employed, images of the output laser beam may be captured with the imaging sensors simultaneously or sequentially, or a combination thereof. For example, where images of the output laser beam are captured with two imaging sensors, the subject methods may include simultaneously capturing an image of the intensity profile of the output laser beam with both imaging sensors. In other embodiments, methods include sequentially capturing images of the output laser beam with two imaging sensors. Where images of the output laser beam are captured sequentially, the time between images captured by the imaging sensors may independently be 0.001 seconds or more, such as 0.01 seconds or more, such as 0.1 seconds or more, such as 1 second or more, such as 5 seconds or more, such as 10 seconds or more, such as 30 seconds or more and including 60 seconds or more. In embodiments where images of the output laser beam are captured sequentially by two or more imaging sensors, the duration between each image capture may be the same or different.

Images of the output laser beam may be captured continuously or in discrete intervals. In some instances, methods include capturing images continuously. In other instances, methods include capturing images in discrete intervals, such as capturing an image of the flow stream every 0.001 millsecond, every 0.01 millsecond, every 0.1 millsecond, every 1 millsecond, every 10 millseconds, every 100 millseconds and including every 1000 millseconds, or some other interval.

In some embodiments, determining an intensity profile of the output laser beam includes generating an intensity profile plot of the plurality of angularly deflected laser beams along a horizontal axis. In generating the intensity profile plot, methods may include determining an intensity value from each angularly deflected laser beam and plotting each intensity value with respect to the position of the angularly deflected laser beam along the horizontal axis. In some instances, the intensity value is determined based on the amplitude of the angularly deflected laser beam along the horizontal axis. In other instances, the intensity value is determined based on the brightness of pixels generated by each angularly deflected laser beam in a captured image of the output laser beam. In some embodiments, each intensity value plotted in the intensity profile plot is based on a single measurement of the output laser beam. In other embodiments, each intensity value plotted in the intensity profile plot is based on an average intensity of each angularly deflected laser beam over a predetermined time period of irradiation. For example, the intensity value determined for each angularly deflected laser beam along the horizontal axis may be an average intensity of 2 or more measurements of the intensity for each angularly deflected laser beam, such as 3 or more, such as 4 or more, such as 5 or more, such as 6 or more, such as 7 or more, such as 8 or more, such as 9 or more, such as 10 or more, such as 25 or more, such as 50 or more and including an average intensity determined from 100 or more measurements of the intensity of each angularly deflected laser beam.

FIG. 1A depicts generating an intensity profile plot of an output laser beam having a plurality of angularly deflected laser beams according to certain embodiments. An image 100 of an output laser beam is captured with an imaging sensor and the intensity of each angularly deflected laser beam is plotted based on position along a horizontal axis to generate a profile plot 101. In image 100, the brightness of each pixel in the image at each position is used to determine the intensity of the angularly deflected laser beam on the output laser beam intensity profile plot 101.

In certain embodiments, methods may include assessing (e.g., by a human or a computer implemented protocol as described in greater detail below) the intensity profile of the output laser beam and identifying one or more adjustments to generate an output laser beam having a desired intensity profile. Depending on the number of angularly deflected laser beams in the output laser beam, the intensity of one or more of the angularly deflected laser beams may be adjusted, such as 2 or more, such as 3 or more, such as 4 or more, such as 5 or more, such as 6 or more, such as 7 or more, such as 8 or more, such as 9 or more, such as 10 or more, such as 25 or more, such as 50 or more and including where the intensity of 100 or more of the angularly deflected laser beams are adjusted.

In some embodiments, methods include adjusting the intensity of one or more of the angularly deflected laser beams in a manner such that two or more angularly deflected laser beams in the output laser beam have the same intensity, such as where 3 or more angularly deflected laser beams have the same intensity, such as where 4 or more angularly deflected laser beams have the same intensity, such as where 5 or more angularly deflected laser beams have the same intensity, such as where 6 or more angularly deflected laser beams have the same intensity, such as where 7 or more angularly deflected laser beams have the same intensity, such as where 8 or more angularly deflected laser beams have the same intensity, such as where 9 or more angularly deflected laser beams have the same intensity, such as where 10 or more angularly deflected laser beams have the same intensity, such as where 25 or more angularly deflected laser beams have the same intensity, such as where 50 or more angularly deflected laser beams have the same intensity and including where 100 or more angularly deflected laser beams have the same intensity.

In some embodiments, methods include adjusting the intensity of one or more of the angularly deflected laser beams in a manner such that the plurality of angularly deflected laser beams of the output laser beam have intensities which vary between each other by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less and including by 0.001% or less. In certain embodiments, methods include adjusting the intensity of one or more of the angularly deflected laser beams in a manner such that the output laser beam exhibits a top-hat beam profile along a horizontal axis. The term "top hat" is used herein in its conventional sense to refer to a beam of irradiation (e.g., light) having near uniform fluence (energy density) along one or more axes orthogonal to the optical axis of the beam of irradiation. In embodiments, output beams of light having a top hat intensity profile exhibit little to no deviation in relative intensity from each edge to the center along the horizontal axis, where beams of light having a top hat intensity profile of interest have an intensity at the center that is from 95% to 99.9% of the intensity at the edges along the horizontal axis, such as 96% to 99.5% and including from 98% to 99% of the intensity at the edges along the horizontal axis.

In some instances, methods include increasing the intensity of one or more of the angularly deflected laser beams to the intensity of the top hat intensity profile, such as 2 or more, such as 3 or more, such as 4 or more, such as 5 or more, such as 6 or more, such as 7 or more, such as 8 or more, such as 9 or more, such as 10 or more, such as 25 or more, such as 50 or more and including increasing the intensity of 100 or more of the angularly deflected laser beams to the intensity of the top hat intensity profile. In other instances, methods include decreasing the intensity of one or more of the angularly deflected laser beams to the intensity of the top hat intensity profile, such as 2 or more, such as 3 or more, such as 4 or more, such as 5 or more, such as 6 or more, such as 7 or more, such as 8 or more, such as 9 or more, such as 10 or more, such as 25 or more, such as 50 or more and including decreasing the intensity of 100 or more of the angularly deflected laser beams to the intensity of the top hat intensity profile.

Figure 1B:
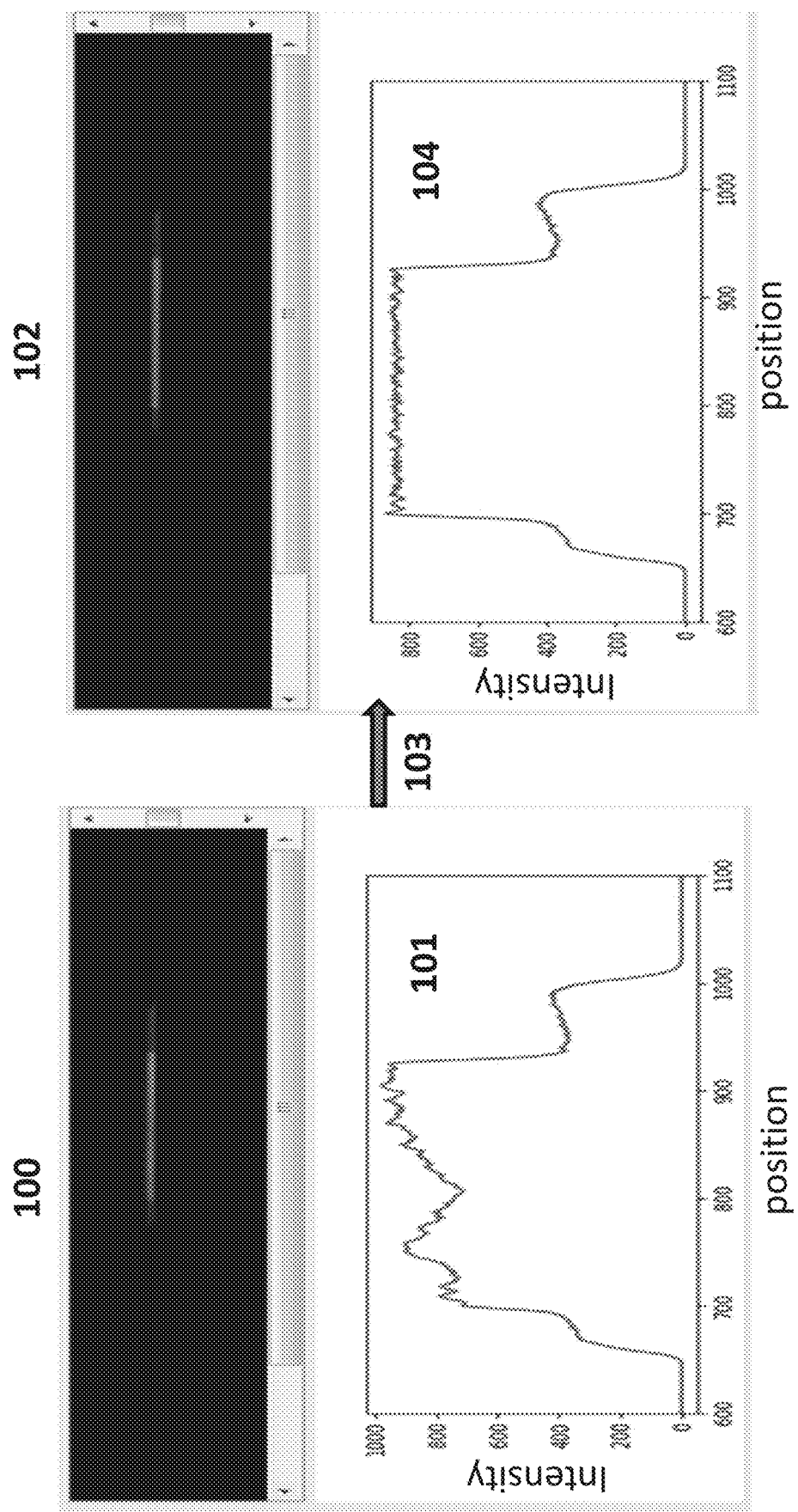
FIG. 1B depicts adjusting the intensity of one or more of the angularly deflected laser beams to generate an output laser beam having a substantially constant intensity profile along a horizontal axis according to certain embodiments.

FIG. 1B depicts adjusting the intensity of one or more of the angularly deflected laser beams to generate an output laser beam having a substantially constant intensity profile along a horizontal axis according to certain embodiments. An image 100 of an output laser beam is captured with an imaging sensor and the intensity of each angularly deflected laser beam is plotted based on position along a horizontal axis to generate a profile plot 101. Based on the generated intensity profile plot, the intensities of a plurality of the angularly deflected laser beams in the output laser beam are increased (103). A second image 102 is captured of the output laser beam after adjusting the intensities of the plurality of the angularly deflected laser beams and an intensity profile plot of the adjusted output laser beam 104 is generated. As described in greater detail below, the intensity of each angularly deflected laser beam is adjusted by identifying (either by the captured image or by intensity profile plot) the position of the angularly deflected laser beam in the output laser beam along a horizontal axis and an adjustment to the waveform inputted into the acousto-optic device is made.

In practicing the subject methods, to adjust the intensity of one or more of the angularly deflected laser beams a parameter of waveforms inputted into the acousto-optic device may be adjusted. In some embodiments, each angularly deflected laser beam for which an increase or decrease in intensity is desired is identified and one or more parameters of the waveform for each identified angularly deflected laser beam are adjusted, such as adjusting 2 or more parameters, such as 3 or more parameters, such as 4 or more parameters, such as 5 or more parameters, such as 6 or more parameters, such as 7 or more parameters, such as 8 or more parameters, such as 9 or more parameters, such as 10 or more parameters, such as 25 or more parameters, such as 50 or more parameters and including adjusting 100 or more parameters of the waveforms inputted for each identified angularly deflected laser beam.

In some instances, methods include adjusting one or more tones of the waveform inputted for each of the identified angularly deflected laser beams, such as 2 or more tones, such as 3 or more tones, such as 4 or more tones, such as 5 or more tones and including 10 or more tones. In some instances, adjusting one or more of the tones of the waveforms inputted for each of the identified angularly deflected laser beams includes adjusting one or more of the distinct sine waves which sum make up each tone, such as adjusting 2 or more, such as 3 or more, such as 4 or more, such as 5 or more, such as 10 or more, such as 15 or more, such as 25 or more, such as 50 or more and including adjusting 100 or more of the sine waves of each tone of the waveforms inputted for each of the identified angularly deflected laser beams.

Where the tones are adjusted, methods according to certain embodiments include adjusting the amplitude of the tones of the waveforms inputted for each of the identified angularly deflected laser beams. In some instances, the amplitude of the tones of the inputted waveform may be increased by 5% or more, such as by 10% or more, such as by 15% or more, such as by 20% or more, such as by 25% or more, such as by 50% or more, such as by 75% or more, such as by 90% or more, such as by 95% or more and including increasing the amplitude of the tones of the inputted waveform by 99% or more. In other instances, the amplitude of the tones of the inputted waveform may be decreased by 5% or more, such as by 10% or more, such as by 15% or more, such as by 20% or more, such as by 25% or more, such as by 50% or more, such as by 75% or more, such as by 90% or more, such as by 95% or more and including decreasing the amplitude of the tones of the inputted waveform by 99% or more.

In other embodiments, methods include adjusting the frequency of the tones of the waveforms inputted for each of the identified angularly deflected laser beams. In some instances, the frequency of the tones of the inputted waveform may be increased by 5% or more, such as by 10% or more, such as by 15% or more, such as by 20% or more, such as by 25% or more, such as by 50% or more, such as by 75% or more, such as by 90% or more, such as by 95% or more and including increasing the frequency of the tones of the inputted waveform by 99% or more. In other instances, the frequency of the tones of the inputted waveform may be decreased by 5% or more, such as by 10% or more, such as by 15% or more, such as by 20% or more, such as by 25% or more, such as by 50% or more, such as by 75% or more, such as by 90% or more, such as by 95% or more and including decreasing the frequency of the tones of the inputted waveform by 99% or more.

In certain embodiments, methods include adjusting the tones of waveforms inputted into the acousto-optic device for each angularly deflected laser beam to have substantially the same amplitude, such as where the amplitude of the tones of waveforms inputted into the acousto-optic device are adjusted to vary between each other by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.1% or less and including by 0.01% or less.

In some embodiments, methods include adjusting the sine waves which form each tone to have substantially the same amplitude, such as where the amplitude of the sine waves of each tone are adjusted to vary between each other by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.1% or less and including by 0.01% or less. In other embodiments, methods include adjusting the sine waves which form each tone to have substantially the same frequency, such as where the frequency of the sine waves of each tone are adjusted to vary between each other by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.1% or less and including by 0.01% or less.

In embodiments, adjustments to the inputted waveforms may be repeated one or more times as desired, such as for example based on the determined output laser beam intensity profile (e.g., from a captured image of the output laser beam). In some embodiments, methods include adjusting one or more parameters of the waveforms inputted into the acousto-optic device for the angularly deflected laser beams and determining an output laser beam intensity profile generated by the adjusted inputted waveforms. In these embodiments, methods may include further adjusting the inputted waveforms one or more subsequent times, such as 2 or more, such as 3 or more, such as 4 or more, such as 5 or more and including adjusting one or more parameters of the waveforms inputted into the acousto-optic device for the angularly deflected laser beams and determining an output laser beam intensity profile generated by the adjusted inputted waveforms 10 or more times.

Figure 2:
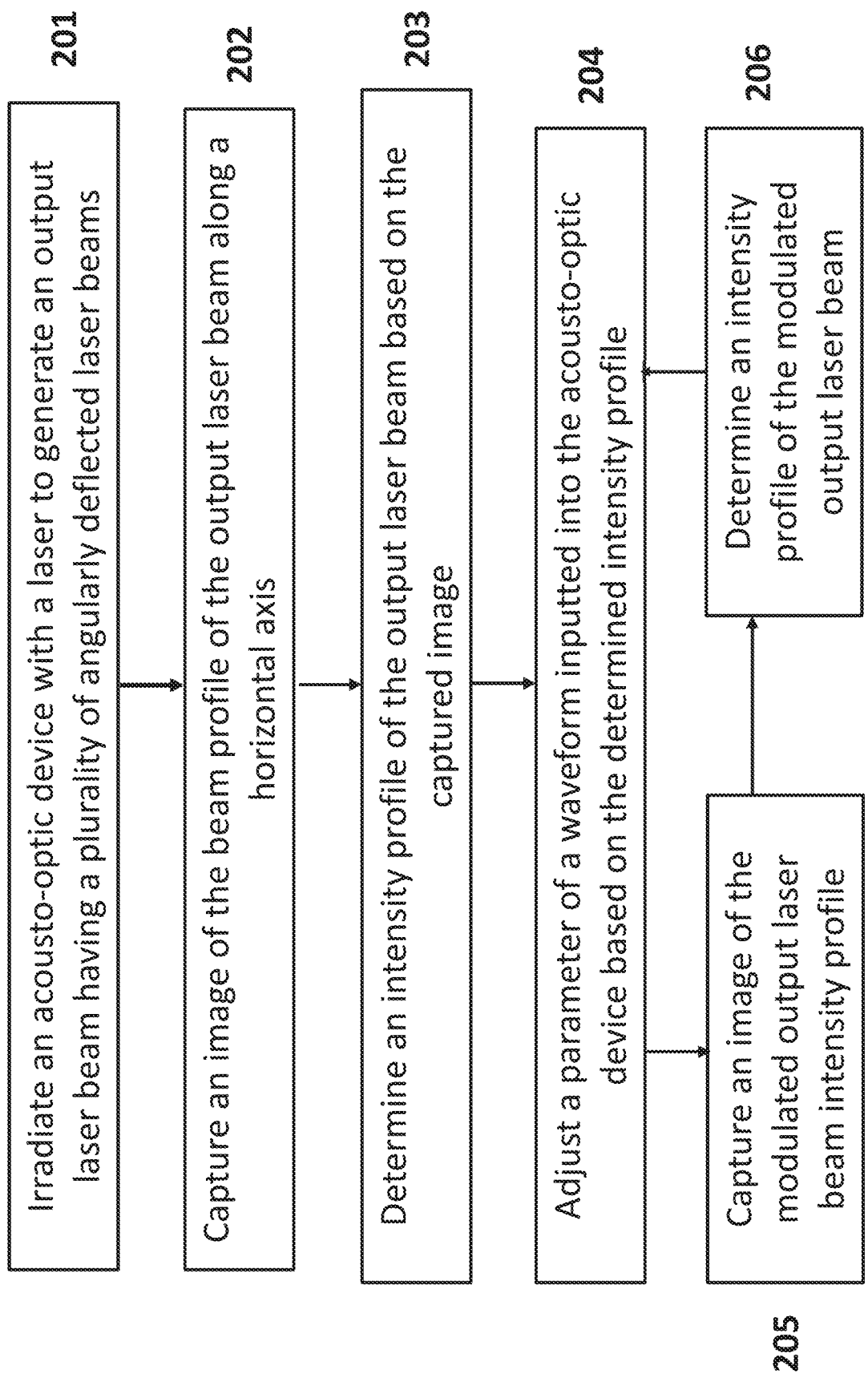
FIG. 2 depicts a flow chart for modulating an intensity profile of an output laser beam having a plurality of angularly deflected laser beams according to certain embodiments.

FIG. 2 depicts a flow chart for modulating an intensity profile of an output laser beam having a plurality of angularly deflected laser beams according to certain embodiments. At step 201, an acousto-optic device (e.g., an acousto-optic modulator) is irradiated with a laser to generate an output laser beam having a plurality of angularly deflected laser beams. To generate the plurality of angularly deflected laser beams, waveforms for each of the angularly deflected laser beams are inputted into the acousto-optic device from a waveform generator. An image of the beam profile of the output laser beam along a horizontal axis is captured at step 202. In some instances, the brightness of the pixel at each position in the captured image corresponds to the intensity of the angularly deflected laser beam in the intensity profile. At step 203, an intensity profile of the output laser beam is determined, such as by generating an intensity profile plot as depicted in FIGS. 1A and 1B. Based on one or more of the captured images generated at step 202 and the intensity profile plot generated at step 203, one or more adjustments to the angularly deflected laser beams is determined at step 204. To adjust the intensity of the identified angularly deflected laser beams, a parameter of the waveform inputted into the acousto-optic device is adjusted for each angularly deflected laser beam. In some instances, one or more tones of the inputted waveform are adjusted, such as by increasing or decreasing the amplitude of the tones of the inputted waveform. A second image of the output laser beam may be captured at step 205 to generate an image and determine an intensity profile at step 206 of the modulated laser beam (i.e., after adjustment to one or more inputted waveforms).

In embodiments, the angularly deflected laser beams in the output laser beam are spatially separated. Depending on the waveforms inputted into the acousto-optic device and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain embodiments, methods include adjusting the spatial width of the output laser beam, such as adjusting the spatial width of the output laser beam along a horizontal axis of the output laser beam. Depending on the size of the output laser beam desired, the spatial width of the output laser beam may be increased by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In other embodiments, methods include decreasing the spatial width of the output laser beam by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more.

In some embodiments, methods further include irradiating a sample in a flow stream (e.g., in a flow cytometer) with the output laser beam having a substantially uniform intensity profile (e.g., top-hat beam intensity profile). In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, or other biological liquid sample, e.g., tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

In certain embodiments, the biological sample contains cells. Cells that may be present in the sample include eukaryotic cells (e.g., mammalian cells) and/or prokaryotic cells (e.g., bacterial cells or archaeal cells). Samples may be obtained from an in vitro source (e.g., a suspension of cells from laboratory cells grown in culture) or from an in vivo source (e.g., a mammalian subject, a human subject, etc.). In some embodiments, the cellular sample is obtained from an in vitro source. In vitro sources include, but are not limited to, prokaryotic (e.g., bacterial, archaeal) cell cultures, environmental samples that contain prokaryotic and/or eukaryotic (e.g., mammalian, protest, fungal, etc.) cells, eukaryotic cell cultures (e.g., cultures of established cell lines, cultures of known or purchased cell lines, cultures of immortalized cell lines, cultures of primary cells, cultures of laboratory yeast, etc.), tissue cultures, and the like.

Where the biological sample includes cells, methods of the present disclosure may include characterizing components of the cells, such as cell fragments, fragmented cell membranes, organelles, dead or lysed cells. In some embodiments, methods include characterizing the extracellular vesicles of the cells. Characterizing the extracellular vesicles of the cells may include identifying the type of extracellular vesicles in the cells or determining the size of the extracellular vesicles in the cells.

The sample in the flow stream may be irradiated continuously or in discrete intervals. In some instances, methods include irradiating the sample in the flow stream with the output laser beam continuously. In other instances, the sample in the flow stream is irradiated with the output laser beam in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

The sample in the flow stream may be irradiated with the output laser beam from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

The flow rate of the flow stream may vary, e.g., depending on the intensity of the light and may be 1 uL/min or more, such as 2 uL/min or more, such as 3 uL/min or more, such as 5 uL/min or more, such as 10 uL/min or more, such as 25 uL/min or more, such as 50 uL/min or more, such as 75 uL/min or more, such as 100 uL/min or more, such as 250 uL/min or more, such as 500 uL/min or more, such as 750 uL/min or more and including 1000 uL/min or more. In certain embodiments, the flow rate of the flow stream in the subject methods ranges from 1 uL/min to 500 uL/min, such as from 1 uL/min to 250 uL/min, such as from 1 uL/min to 100 uL/min, such as from 2 uL/min to 90 uL/min, such as from 3 uL/min to 80 uL/min, such as from 4 uL/min to 70 uL/min, such as from 5 uL/min to 60 uL/min and including rom 10 uL/min to 50 uL/min. In certain embodiments, the flow rate of the flow stream is from 5 uL/min to 6 uL/min.

Methods according to certain embodiments also include detecting light from the sample in the irradiated flow stream. The light detected may be side scattered light, forward scattered light, emitted light or combination thereof. Suitable light detecting protocols, include but are not limited to optical sensors or photodetectors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from the irradiated flow stream at the sample interrogation region of the particle sorting module is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, light from the irradiated flow stream is measured with a charge-coupled device (CCD).

In some embodiments, light (e.g., forward scattered light, side scattered light, emitted light, etc.) is detected directly from the sample in the flow stream. In other embodiments, light from the sample in the flow stream is propagated to a detector with one or more optical adjustment components. By "optical adjustment" is meant that light from the sample in the flow stream is changed as desired. For example, the beam path, direction, focus or collimation of the light from the sample in the flow stream may be changed with an optical adjustment component. In some instances, the dimensions of the light collected from the sample in the flow stream is adjusted, such as increasing the dimensions by 5% or more, such as by 10% or more, such as by 25% or more, such as by 50% or more and including increasing the dimensions by 75% or more or focusing the light so as to reduce the light dimensions, such as by 5% or greater, such as by 10% or greater, such as by 25% or greater, such as by 50% or greater and including reducing the dimensions by 75% or greater. In other instances, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam. In certain embodiments, the optical adjustment component is a wavelength separator. The term "wavelength separator" is used herein in its conventional sense to refer to an optical protocol for separating polychromatic light into its component wavelengths. Wavelength separation, according to certain embodiments, may include selectively passing or blocking specific wavelengths or wavelength ranges of the polychromatic light. Wavelength separation protocols of interest include, but are not limited to, colored glass, bandpass filters, interference filters, dichroic mirrors, diffraction gratings, monochromators and combinations thereof, among other wavelength separating protocols. In some embodiments, the wavelength separator is an optical filter. For example, the optical filter may be a bandpass filter having minimum bandwidths ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm.

In certain embodiments, the detector is positioned apart in space from the sample in the flow stream and light from the sample in the flow stream is propagated to the detector through an optical relay system, such as with fiber optics or a free space light relay system. For example, the optical relay system may be a fiber optics light relay bundle and light is conveyed through the fiber optics light relay bundle to the detector. Any fiber optics light relay system may be employed to propagate light to the detector. In certain embodiments, suitable fiber optics light relay systems for propagating light to the detector include, but are not limited to, fiber optics light relay systems such as those described in U.S. Pat. No. 6,809,804, the disclosure of which is herein incorporated by reference. In other embodiments, the optical relay system is a free-space light relay system. The phrase "free-space light relay" is used herein in its conventional sense to refer to light propagation that employs a configuration of one or more optical components to direct light to the detector through free-space. In certain embodiments, the free-space light relay system includes a housing having a proximal end and a distal end, the proximal end being coupled to the detector. The free-space relay system may include any combination of different optical adjustment components, such as one or more of lenses, mirrors, slits, pinholes, wavelength separators, or a combination thereof. For example, in some embodiments, free-space light relay systems of interest include one or more focusing lens. In other embodiments, the subject free-space light relay systems include one or more mirrors. In yet other embodiments, the free-space light relay system includes a collimating lens. In certain embodiments, suitable free-space light relay systems for propagating light to the detector, but are not limited to, light relay systems such as those described in U.S. Pat. Nos. 7,643,142; 7,728,974 and 8,223,445, the disclosures of which is herein incorporated by reference.

Methods according to certain embodiments also include measuring light from the sample in the flow stream at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, methods include measuring the collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of certain fluorophores.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

In certain instances, the flow stream is irradiated with a plurality of angularly deflected beams of frequency-shifted light and a cell in the flow stream is imaged by fluorescence imaging using radiofrequency tagged emission (FIRE) to generate a frequency-encoded image, such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

Methods in certain embodiments also include data acquisition, analysis and recording, such as with a computer, where multiple data channels record data from the sample as it passes through the detection region of the system. In these embodiments, analysis may include classifying and counting cells or components of cells (extracellular vesicles) such that each component is present as a set of digitized parameter values. The subject systems may be set to trigger on a selected parameter in order to distinguish the particles of interest from background and noise. "Trigger" refers to a preset threshold for detection of a parameter and may be used as a means for detecting passage of a component of interest through the detection region. Detection of an event that exceeds the threshold for the selected parameter triggers acquisition of data for the sample component. Data is not acquired for components in the medium being assayed which cause a response below the threshold.

In some embodiments, methods further include sorting one or more particles (e.g., cells) of the sample. The term "sorting" is used herein in its conventional sense to refer to separating components (e.g., cells, non-cellular particles such as biological macromolecules) of the sample and in some instances delivering the separated components to one or more sample collection containers. For example, methods may include sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

In some embodiments, methods for sorting components of sample include sorting particles (e.g., cells in a biological sample), such as described in U.S. Pat. Nos. 3,960,449; 4,347,935; 4,667,830; 5,245,318; 5,464,581; 5,483,469; 5,602,039; 5,643,796; 5,700,692; 6,372,506 and 6,809,804, the disclosures of which are herein incorporated by reference. In some embodiments, methods include sorting components of the sample with a particle sorting module, such as those described in U.S. Pat. Nos. 9,551,643 and 10,324,019, U.S. Patent Publication No. 2017/0299493 and International Patent Publication No. WO/2017/040151, the disclosure of which is incorporated herein by reference. In certain embodiments, cells of the sample are sorted using a sort decision module having a plurality of sort decision units, such as those described in U.S. patent application Ser. No. 16/725,756, filed on Dec. 23, 2019, the disclosure of which is incorporated herein by reference.

Systems for Modulating an Output Laser Beam Having Angularly Deflected Laser Beams As summarized above, aspects of the present disclosure include systems configured to generate an output laser beam having a plurality of angularly deflected laser beams (e.g., for irradiating a sample in a flow stream). In embodiments, systems include a laser, an acousto-optic device, a waveform generator configured to input a waveform into the acousto-optic device to generate an output laser beam having a plurality of angularly deflected laser beams, a photodetector configured to determine an intensity profile of the plurality of angularly deflected laser beams along a horizontal axis and a controller with a processor having memory operably coupled to the processor where the memory includes instructions stored thereon, which when executed by the processor, cause the processor to determine an intensity profile of the output laser beam along a horizontal axis and adjust one or more parameters of a waveform inputted into the acousto-optic device in response to the determined intensity profile to generate an output laser beam having a modulated intensity profile. As described in greater detail below, in certain instances the subject systems are configured to adjust one or more parameters of waveforms inputted into the acousto-optic device to generate an output beam having a plurality of angularly deflected laser beams with substantially the same intensity (e.g., having a top-hat intensity profile).

In embodiments, the subject systems include one or more lasers. Lasers of interest may include pulsed lasers or continuous wave lasers. The type and number of lasers used in the subject methods may vary and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the acousto-optic device with a dye laser, such as a stilbene, coumarin or rhodamine laser. In yet other instances, methods include irradiating the acousto-optic device with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the acousto-optic device with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof. In still other instances, methods include irradiating the acousto-optic device with a semiconductor diode laser, optically pumped semiconductor laser (OPSL), or a frequency doubled- or frequency tripled implementation of any of the above mentioned lasers.

Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. Systems may include one or more lasers, such as 2 or more lasers, such as 3 or more lasers, such as 4 or more lasers, such as 5 or more lasers and including 10 or more lasers. The lasers may include any combination of types of lasers. For example, in some embodiments, the subject systems include an array of lasers, such as an array having one or more gas lasers, one or more dye lasers and one or more solid-state lasers.

Where more than one laser is employed, each laser may be configured to irradiate simultaneously or sequentially, or a combination thereof. For example, the lasers may be configured to irradiate the acousto-optic device simultaneously. In other embodiments, the lasers are configured to irradiate the acousto-optic device sequentially. Where systems include more than one laser to irradiate the acousto-optic device sequentially, the time each laser is configured for irradiation may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, each laser may be configured irradiating for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where acousto-optic device is sequentially irradiated with two or more lasers, the duration the acousto-optic device is irradiated by each laser may be the same or different.

Each laser may be configured to irradiate with a time period between each irradiation being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

Each laser may be configured to irradiate continuously or in discrete intervals. In some instances, each laser is configured to operate continuously. In other instances, each laser is configured to operate in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

The laser may be operationally positioned from the acousto-optic device at a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the laser may be operationally positioned at an angle of irradiation ranging from 10° to 90°, such as from 15° to 85°, such as from 20° to 80°, such as from 25° to 75° and including from 30° to 60°, for example at a 90° angle.

The acousto-optic device may be any convenient acousto-optic protocol configured to frequency shift laser light using applied acoustic waves. In certain embodiments, the acousto-optic device is an acousto-optic deflector. In other embodiments, the acousto-optic device is an acousto-optic frequency shifter. In yet other embodiments, the acousto-optic device is an acousto-optic modulator. The acousto-optic device in the subject system is configured to generate angularly deflected laser beams from the light from the laser and waveforms from a waveform generator.

In embodiments, systems include a waveform generator configured to generate and input a waveform into the acousto-optic device for each angularly deflected laser beam to the acousto-optic device to generate the plurality of angularly deflected laser beams of the output laser beam. Waveform generators may include but are not limited to direct digital synthesizer, electronic pulse generators and arbitrary waveform generators. Waveform generators may be configured to generate one or more waveforms for each angularly deflected laser beam in the output beam, such as 2 or more, such as 3 or more, such as 4 or more, such as 5 or more, such as 10 or more, such as 15 or more, such as 25 or more, such as 50 or more and including 100 or more waveforms. In some embodiments, the inputted waveforms include one or more tones, such as 2 or more tones, such as 3 or more tones, such as 4 or more tones, such as 5 or more tones and including 10 or more tones. Each tone is, in certain instances, a sum of distinct sine waves, such as a sum of 2 or more distinct sine waves, such as 3 or more, such as 4 or more, such as 5 or more, such as 10 or more, such as 25 or more, such as 100 or more and including where each tone is a sum of 500 or more distinct sine waves.

In some embodiments, waveform generators are configured to generate waveforms where the angularly deflected laser beams produced by the inputted waveforms each have an intensity based on the amplitude of the tones of the waveform. In some embodiments, the waveform generator is configured to generate and input waveforms into the acousto-optic device having tones which independently each have substantially the same amplitude, such as where the amplitude of the tones of waveforms inputted into the acousto-optic device vary from each other by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.1% or less and including by 0.01% or less. In some embodiments, the sine waves which from each tone have an amplitude which vary between tones by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.1% or less and including by 0.01% or less.

Systems according to certain embodiments include a photodetector for determining an intensity profile of the output laser beam along a horizontal axis. The photodetector for determining the intensity profile of the output laser beam can be any convenient photodetector protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

As described above, in some instances the intensity profile of the output laser beam is determined by capturing an image of the output laser beam. In these embodiments, systems may include any suitable device capable of capturing and converting an optical image into an electronic data signal, including but not limited to charge-coupled devices, semiconductor charge-coupled devices (CCD), active pixel sensors (APS), complementary metal-oxide semiconductor (CMOS) image sensors or N-type metal-oxide semiconductor (NMOS) image sensors. In some embodiments, the imaging sensor is a CCD camera. For example, the camera may be an electron multiplying CCD (EMCCD) camera or an intensified CCD (ICCD) camera. In other embodiments, the imaging sensor is a CMOS-type camera.

Systems may include one or more imaging sensors. In some embodiments, systems include a combination of imaging sensors, such as two or more imaging sensors, such as three or more imaging sensors, such as four or more imaging sensors and including five or more imaging sensors. Where systems include more than one imaging sensor, the imaging sensors may be configured to operate simultaneously or sequentially, or a combination thereof. In some embodiments, imaging sensors are configured to capture images of the intensity profile of the output laser beam simultaneously. In other embodiments, imaging sensors are configured to capture images of the intensity profile of the output laser beam sequentially. Where images of the output laser beam are captured sequentially, the time between images captured by the imaging sensors may independently be 0.001 seconds or more, such as 0.01 seconds or more, such as 0.1 seconds or more, such as 1 second or more, such as 5 seconds or more, such as 10 seconds or more, such as 30 seconds or more and including 60 seconds or more.

Imaging sensors may be configured to capture an image of the output laser beam continuously or in discrete intervals. In some instances, imaging sensors are configured to capture images continuously. In other instances, imaging sensors are configured to capture images in discrete intervals, such as capturing an image of the flow stream every 0.001 millsecond, every 0.01 millsecond, every 0.1 millsecond, every 1 millsecond, every 10 millseconds, every 100 millseconds and including every 1000 millseconds, or some other interval.

Figure 3A:
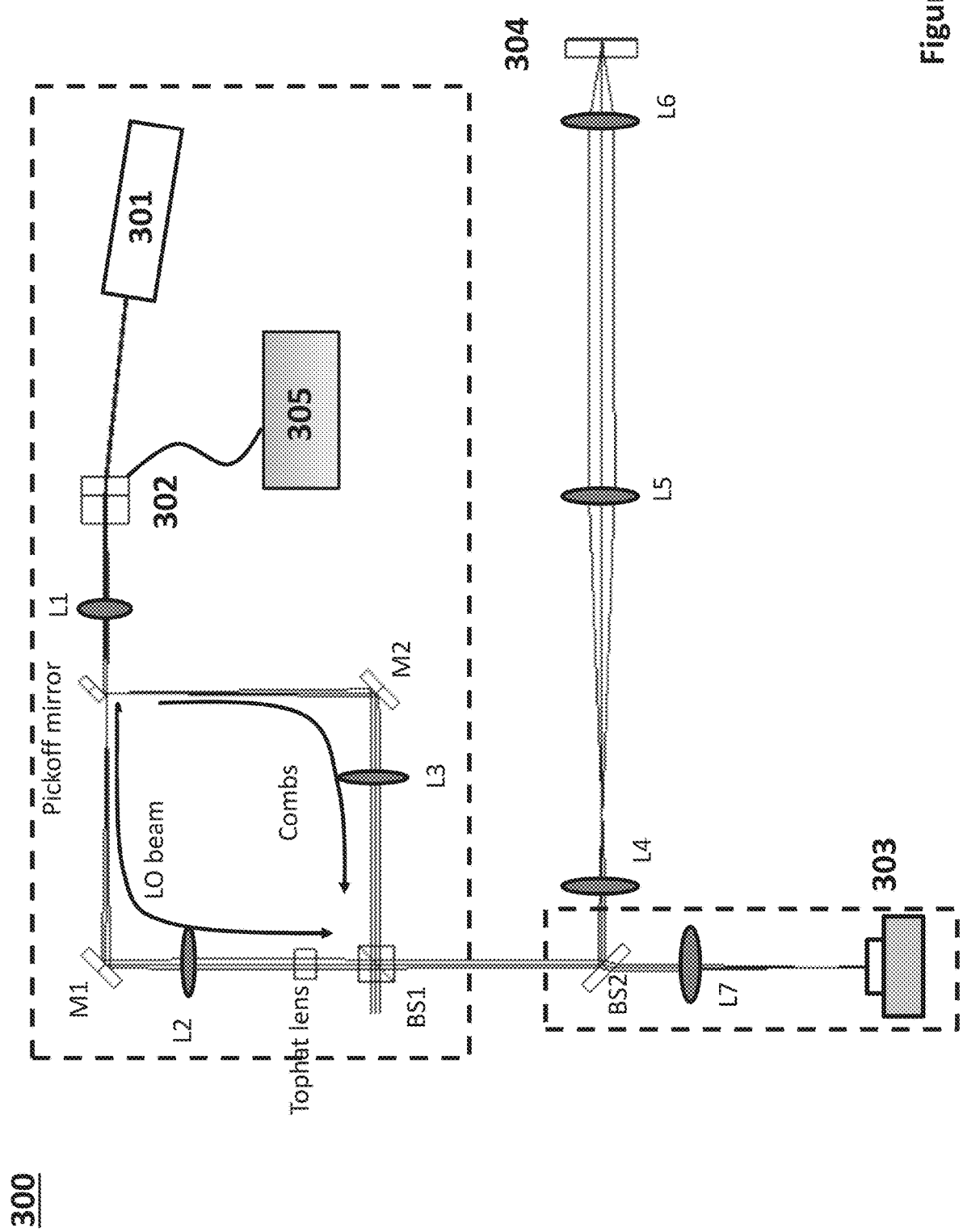
FIGS. 3A-3B depict a system for modulating an output laser beam having a plurality of angularly deflected laser beams according to certain embodiments.

FIG. 3A depicts a system for modulating an output laser beam having a plurality of angularly deflected laser beams according to certain embodiments. System 300 includes laser 301 which is configured to irradiate acousto-optic device (e.g., acousto-optic deflector) 302 that is in communication with waveform generator 305. Parameters (e.g., tones formed from a sum of sine waves) are inputted into waveform generator 305 (e.g., arbitrary waveform generator) to generate a plurality of waveforms that are communicated to acousto-optic device 302 to generate a plurality of angularly deflected laser beams. The plurality of angularly deflected laser beams include a local oscillator beam (LO beam) and a plurality of radiofrequency shifted comb beams (combs) which are separated in system 300 with a pickoff mirror. The local oscillator beam is passed through a tophat lens (e.g., a Powell lens) to generate a constant beam profile and is recombined with the comb beams with a beam splitter (BS1). An image of the beam profile of the plurality of angularly deflected laser beams is captured with imaging sensor 303 and an intensity profile plot may be generated based on the captured image. One or more parameters of the waveforms used to generate the plurality of angularly deflected laser beams may be adjusted and re-inputted into waveform generator 305 to modulate the beam profile of the output laser beam. The modulated output laser beam having, in certain instances, an intensity profile which exhibits little to no variation along a horizontal axis may be used to irradiate a sample in a flow stream propagated through flow cell 304.

Figure 3B:
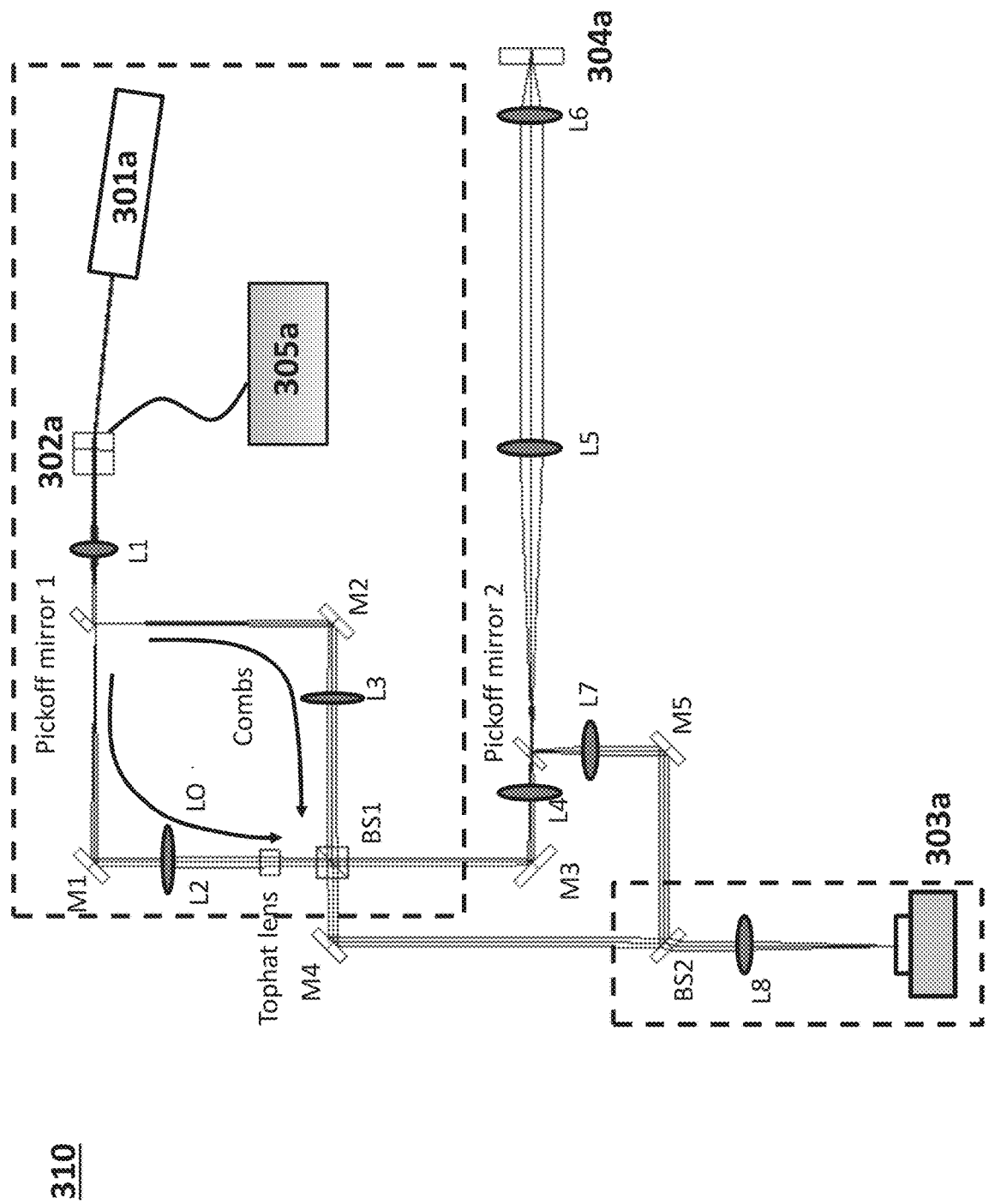

FIG. 3B depicts a system for modulating an output laser beam having a plurality of angularly deflected laser beams according to certain embodiments. System 310 includes laser 301*a* which is configured to irradiate acousto-optic device 302*a* that is in communication with waveform generator 305*a*. Waveforms from waveform generator 305*a* are communicated to acousto-optic device 302a to generate a plurality of angularly deflected laser beams. A local oscillator beam (LO beam) and a plurality of radiofrequency shifted comb beams (combs) are separated with a first pickoff mirror (pickoff mirror 1). The local oscillator beam is passed through a tophat lens and is recombined with the comb beams with a first beam splitter (BS1). A first set of beams from beam splitter BS1 is propagated to a second pickoff mirror (pickoff mirror 2) which conveys a part of the first set of beams to a flow cell 304a. A second set of beams from beam splitter BS1 is recombined with light from the second pickoff mirror (pickoff mirror 2) and conveyed to imaging sensor 303a. An image of the beam profile of the plurality of angularly deflected laser beams is captured with imaging sensor 303a and an intensity profile plot may be generated based on the captured image. One or more parameters of the waveforms used to generate the plurality of angularly deflected laser beams may be adjusted and re-inputted into waveform generator 305a to modulate the beam profile of the output laser beam.

In some embodiments, systems include a controller with a processor having memory operably coupled to the processor where the memory includes instructions stored thereon, which when executed by the processor, cause the processor to determine an intensity profile of the output laser beam by generating an intensity profile plot of the plurality of angularly deflected laser beams along a horizontal axis. In some instances, the memory includes instructions for determining an intensity value from each angularly deflected laser beam and plotting each intensity value with respect to the position of the angularly deflected laser beam along the horizontal axis. In some instances, the memory includes instructions for determining the intensity value based on the amplitude of the angularly deflected laser beam along the horizontal axis. In other instances, the memory includes instructions for determining the intensity value based on the brightness of pixels generated by each angularly deflected laser beam in a captured image of the output laser beam.

In some embodiments, systems include a controller with a processor having memory operably coupled to the processor where the memory includes instructions stored thereon, which when executed by the processor, cause the processor to plot each intensity value based on a single measurement of the output laser beam. In other embodiments, the memory includes instructions for plotting each intensity based on an average intensity of each angularly deflected laser beam over a predetermined time period of irradiation. For example, the intensity value determined for each angularly deflected laser beam along the horizontal axis may be an average intensity of 2 or more measurements of the intensity for each angularly deflected laser beam, such as 3 or more, such as 4 or more, such as 5 or more, such as 6 or more, such as 7 or more, such as 8 or more, such as 9 or more, such as 10 or more, such as 25 or more, such as 50 or more and including an average intensity determined from 100 or more measurements of the intensity of each angularly deflected laser beam.

In certain embodiments, systems include a controller with a processor having memory operably coupled to the processor where the memory includes instructions stored thereon, which when executed by the processor, cause the processor to assess the intensity profile of the output laser beam and determine one or more adjustments to generate an output laser beam having a desired intensity profile. In some instances, the memory includes instructions for identifying one or more of the angularly deflected laser beams of the output laser beams for adjustment. Depending on the number of angularly deflected laser beams in the output laser beam, the intensity of one or more of the angularly deflected laser beams may be adjusted, such as 2 or more, such as 3 or more, such as 4 or more, such as 5 or more, such as 6 or more, such as 7 or more, such as 8 or more, such as 9 or more, such as 10 or more, such as 25 or more, such as 50 or more and including where the intensity of 100 or more of the angularly deflected laser beams are adjusted.

In some embodiments, systems include a controller with a processor having memory operably coupled to the processor where the memory includes instructions stored thereon, which when executed by the processor, cause the processor to adjust the intensity of one or more of the angularly deflected laser beams in a manner such that two or more angularly deflected laser beams in the output laser beam have the same intensity, such as where 3 or more angularly deflected laser beams have the same intensity, such as where 4 or more angularly deflected laser beams have the same intensity, such as where 5 or more angularly deflected laser beams have the same intensity, such as where 6 or more angularly deflected laser beams have the same intensity, such as where 7 or more angularly deflected laser beams have the same intensity, such as where 8 or more angularly deflected laser beams have the same intensity, such as where 9 or more angularly deflected laser beams have the same intensity, such as where 10 or more angularly deflected laser beams have the same intensity, such as where 25 or more angularly deflected laser beams have the same intensity, such as where 50 or more angularly deflected laser beams have the same intensity and including where 100 or more angularly deflected laser beams have the same intensity.

In some embodiments, the memory includes instructions for adjusting the intensity of one or more of the angularly deflected laser beams in a manner such that the plurality of angularly deflected laser beams of the output laser beam have intensities which vary between each other by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less and including by 0.001% or less. In certain embodiments, the memory includes instructions for adjusting the intensity of one or more of the angularly deflected laser beams in a manner such that the output laser beam exhibits a top-hat beam profile along a horizontal axis.

In some instances, systems include a controller with a processor having memory operably coupled to the processor where the memory includes instructions stored thereon, which when executed by the processor, cause the processor to increase the intensity of one or more of the angularly deflected laser beams to the intensity of the top hat intensity profile, such as 2 or more, such as 3 or more, such as 4 or more, such as 5 or more, such as 6 or more, such as 7 or more, such as 8 or more, such as 9 or more, such as 10 or more, such as 25 or more, such as 50 or more and including increasing the intensity of 100 or more of the angularly deflected laser beams to the intensity of the top hat intensity profile.

In other instances, the memory includes instructions for decreasing the intensity of one or more of the angularly deflected laser beams to the intensity of the top hat intensity profile, such as 2 or more, such as 3 or more, such as 4 or more, such as 5 or more, such as 6 or more, such as 7 or more, such as 8 or more, such as 9 or more, such as 10 or more, such as 25 or more, such as 50 or more and including decreasing the intensity of 100 or more of the angularly deflected laser beams to the intensity of the top hat intensity profile.

In certain embodiments, systems include a controller with a processor having memory operably coupled to the processor where the memory includes instructions stored thereon, which when executed by the processor, cause the processor to adjust the intensity of one or more of the angularly deflected laser beams by adjusting a parameter of waveforms inputted into the acousto-optic device. In some embodiments, the memory includes instructions for identifying each angularly deflected laser beam where an increase or decrease in intensity is needed or desired and adjusting one or more parameters of the waveform for each identified angularly deflected laser beam, such as memory having instructions for adjusting 2 or more parameters, such as 3 or more parameters, such as 4 or more parameters, such as 5 or more parameters, such as 6 or more parameters, such as 7 or more parameters, such as 8 or more parameters, such as 9 or more parameters, such as 10 or more parameters, such as 25 or more parameters, such as 50 or more parameters and including adjusting 100 or more parameters of the waveforms inputted for each identified angularly deflected laser beam.

In some instances, the memory includes instructions for adjusting one or more tones of the waveform inputted for each of the identified angularly deflected laser beams, such as 2 or more tones, such as 3 or more tones, such as 4 or more tones, such as 5 or more tones and including 10 or more tones. In some instances, the memory includes instructions for adjusting one or more of the distinct sine waves which sum make up each tone, such as 2 or more, such as 3 or more, such as 4 or more, such as 5 or more, such as 10 or more, such as 15 or more, such as 25 or more, such as 50 or more and including adjusting 100 or more of the sine waves of each tone of the waveforms inputted for each of the identified angularly deflected laser beams.

In certain embodiments, the memory includes instructions for adjusting the amplitude of the tones of the waveforms inputted for each of the identified angularly deflected laser beams. In some instances, the memory includes instructions for increasing the amplitude of the tones of the inputted waveform by 5% or more, such as by 10% or more, such as by 15% or more, such as by 20% or more, such as by 25% or more, such as by 50% or more, such as by 75% or more, such as by 90% or more, such as by 95% or more and including increasing the amplitude of the tones of the inputted waveform by 99% or more. In other instances, the memory includes instructions for decreasing the amplitude of the tones of the inputted waveform by 5% or more, such as by 10% or more, such as by 15% or more, such as by 20% or more, such as by 25% or more, such as by 50% or more, such as by 75% or more, such as by 90% or more, such as by 95% or more and including decreasing the amplitude of the tones of the inputted waveform by 99% or more.

In other instances, the memory includes instructions for adjusting the frequency of the tones of the waveforms inputted for each of the identified angularly deflected laser beams. In some instances, the memory includes instructions for increasing the frequency of the tones of the inputted waveform by 5% or more, such as by 10% or more, such as by 15% or more, such as by 20% or more, such as by 25% or more, such as by 50% or more, such as by 75% or more, such as by 90% or more, such as by 95% or more and including increasing the frequency of the tones of the inputted waveform by 99% or more. In other instances, the memory includes instructions for decreasing the frequency of the tones of the inputted waveform by 5% or more, such as by 10% or more, such as by 15% or more, such as by 20% or more, such as by 25% or more, such as by 50% or more, such as by 75% or more, such as by 90% or more, such as by 95% or more and including decreasing the frequency of the tones of the inputted waveform by 99% or more.

In certain embodiments, systems include a controller with a processor having memory operably coupled to the processor where the memory includes instructions stored thereon, which when executed by the processor, cause the processor to adjust the tones of waveforms inputted into the acousto-optic device for each angularly deflected laser beam to have substantially the same amplitude, such as where the amplitude of the tones of waveforms inputted into the acousto-optic device are adjusted to vary between each other by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.1% or less and including by 0.01% or less. In some embodiments, the memory includes instructions for adjusting the sine waves which form each tone to have substantially the same amplitude, such as where the amplitude of the sine waves of each tone are adjusted to vary between each other by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.1% or less and including by 0.01% or less. In other embodiments, the memory includes instructions for adjusting the sine waves which form each tone to have substantially the same frequency, such as where the frequency of the sine waves of each tone are adjusted to vary between each other by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.1% or less and including by 0.01% or less.

In some embodiments, systems include a flow cell configured to propagate the sample in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 µL/min or more, such as 2 µL/min or more, such as 3 µL/min or more, such as 5 µL/min or more, such as 10 µL/imin or more, such as 15 µL/min or more, such as 25 µL/min or more, such as 50 µL/min or more and including 100 µL/min or more, where in some instances the rate of sample conveyed to the flow cell chamber by the sample injection port is 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more and including 100 µL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 µL/sec or more, such as 50 µL/sec or more, such as 75 µL/sec or more, such as 100 µL/sec or more, such as 250 µL/sec or more, such as 500 µL/sec or more, such as 750 µL/sec or more, such as 1000 µL/sec or more and including 2500 µL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 µL/min (microliter per minute) or more, such as 2 µL/min or more, such as 3 µL/min or more, such as 5 µL/min or more, such as 10 µL/min or more, such as 25 µL/min or more, such as 50 µL/min or more, such as 75 µL/min or more, such as 100 µL/min or more, such as 250 µL/min or more, such as 500 µL/min or more, such as 750 µL/min or more and including 1000 µL/min or more. For example, the system may include a pump that is configured to flow sample through the flow cell at a rate that ranges from 1 µL/min to 500 µL/min, such as from 1 uL/min to 250 uL/min, such as from 1 uL/min to 100 uL/min, such as from 2 µL/min to 90 µL/min, such as from 3 µL/min to 80 µL/min, such as from 4 µL/min to 70 µL/min, such as from 5 µL/min to 60 µL/min and including rom 10 µL/min to 50 µL/min. In certain embodiments, the flow rate of the flow stream is from 5 µL/min to 6 µL/min.

Systems also include one or more detectors for detecting light from a sample in a flow stream (e.g., in a flow cytometer). The detectors may be configured to detect side scattered light, forward scattered light, emitted light or combination thereof. Suitable light detecting protocols, include but are not limited to optical sensors or photodetectors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from the irradiated flow stream at the sample interrogation region of the particle sorting module is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, light is measured with a charge-coupled device (CCD).

Systems may also include one or more optical adjustment components. For example, systems may include lens, mirrors, collimators, wavelength separators such as colored glass, bandpass filters, interference filters, dichroic mirrors, diffraction gratings, monochromators, etc. In certain embodiments, systems include a beam splitter and an optical inverter component, such as for inverting an output laser beam along a horizontal axis as described above. In certain embodiments, the detector is positioned apart in space from the sample in the flow stream and light from the sample in the flow stream is propagated to the detector through an optical relay system, such as with fiber optics or a free space light relay system. For example, the optical relay system may be a fiber optics light relay bundle and light is conveyed through the fiber optics light relay bundle to the detector. Any fiber optics light relay system may be employed to propagate light to the detector. In certain embodiments, suitable fiber optics light relay systems for propagating light to the detector include, but are not limited to, fiber optics light relay systems such as those described in U.S. Pat. No. 6,809,804, the disclosure of which is herein incorporated by reference. In other embodiments, the optical relay system is a free-space light relay system. The phrase "free-space light relay" is used herein in its conventional sense to refer to light propagation that employs a configuration of one or more optical components to direct light to the detector through free-space. In certain embodiments, the free-space light relay system includes a housing having a proximal end and a distal end, the proximal end being coupled to the detector. The free-space relay system may include any combination of different optical adjustment components, such as one or more of lenses, mirrors, slits, pinholes, wavelength separators, or a combination thereof. For example, in some embodiments, free-space light relay systems of interest include one or more focusing lens. In other embodiments, the subject free-space light relay systems include one or more mirrors. In yet other embodiments, the free-space light relay system includes a collimating lens. In certain embodiments, suitable free-space light relay systems for propagating light to the detector, but are not limited to, light relay systems such as those described in U.S. Pat. Nos. 7,643,142; 7,728,974 and 8,223,445, the disclosures of which is herein incorporated by reference.

In certain embodiments, the subject systems are flow cytometric systems employing the above described light detection system for detecting light emitted by a sample in a flow stream. In certain embodiments, the subject systems are flow cytometric systems. Suitable flow cytometry systems may include, but are not limited to those described in Ormerod (ed.), Flow Cytometry: A Practical Approach, Oxford Univ. Press (1997); Jaroszeski et al. (eds.), Flow Cytometry Protocols, Methods in Molecular Biology No. 91, Humana Press (1997); Practical Flow Cytometry, 3rd ed., Wiley-Liss (1995); Virgo, et al. (2012) Ann Clin Biochem. January; 49(pt 1):17-28; Linden, et. al., Semin Throm Hemost. 2004 October; 30(5):502-11; Alison, et al. J Pathol, 2010 December; 222(4):335-344; and Herbig, et al. (2007) Crit Rev Ther Drug Carrier Syst. 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In certain instances, the subject systems are flow cytometry systems configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

In certain embodiments, the subject systems are configured to sort one or more of the particles (e.g., cells) of the sample. The term "sorting" is used herein in its conventional sense to refer to separating components (e.g., cells, non-cellular particles such as biological macromolecules) of the sample and in some instances delivering the separated components to one or more sample collection containers. For example, the subject systems may be configured for sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

In some embodiments, particle sorting systems of interest are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g, cells) of the sample are sorted using a sort decision module having a plurality of sort decision units, such as those described in U.S. patent application Ser. No. 16/725,756, filed on Dec. 23, 2019, the disclosure of which is incorporated herein by reference. In some embodiments, the subject particle sorting systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

Figure 4A:
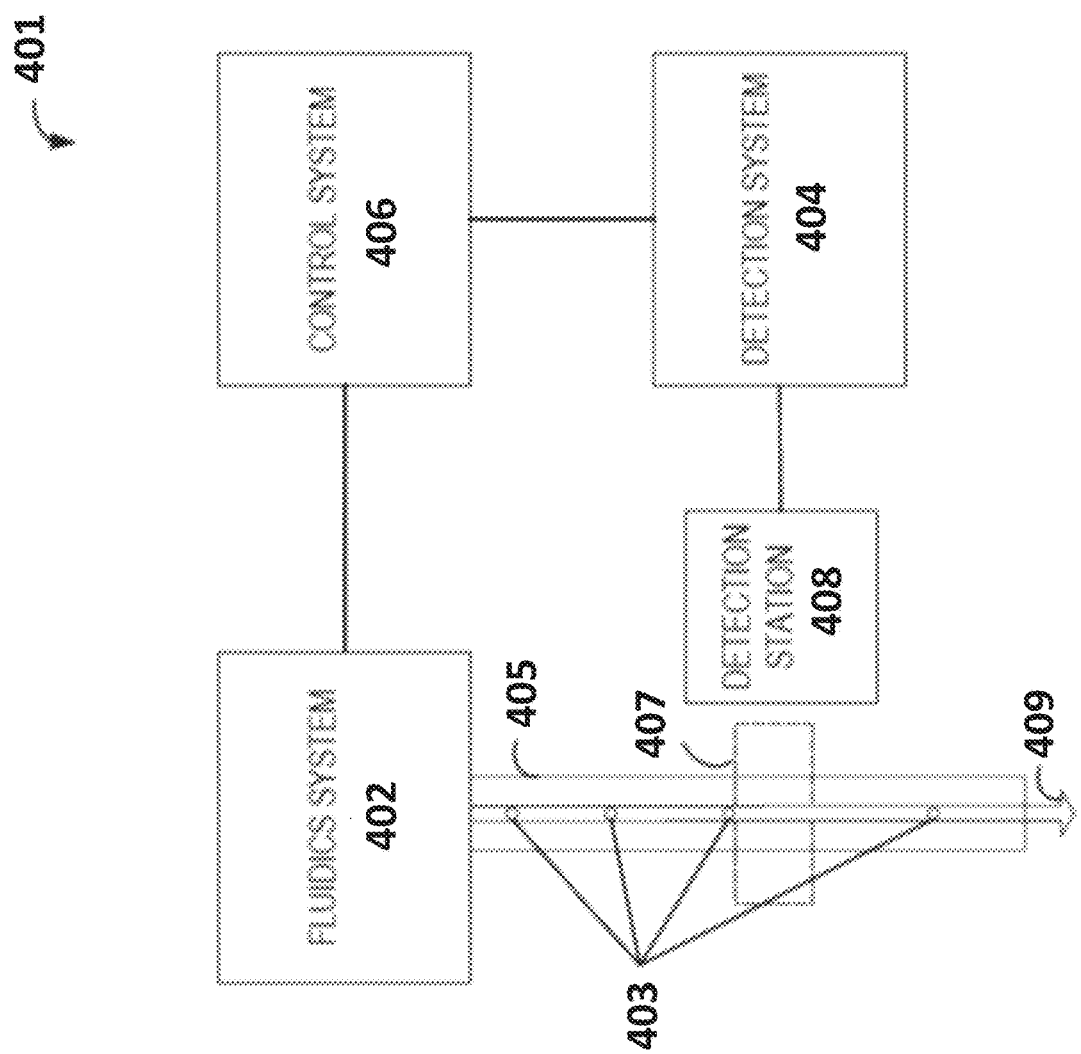
FIG. 4A depicts a functional block diagram of a particle analysis system for computational based sample analysis and particle characterization according to certain embodiments.

In some embodiments, systems are particle analyzers where the 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
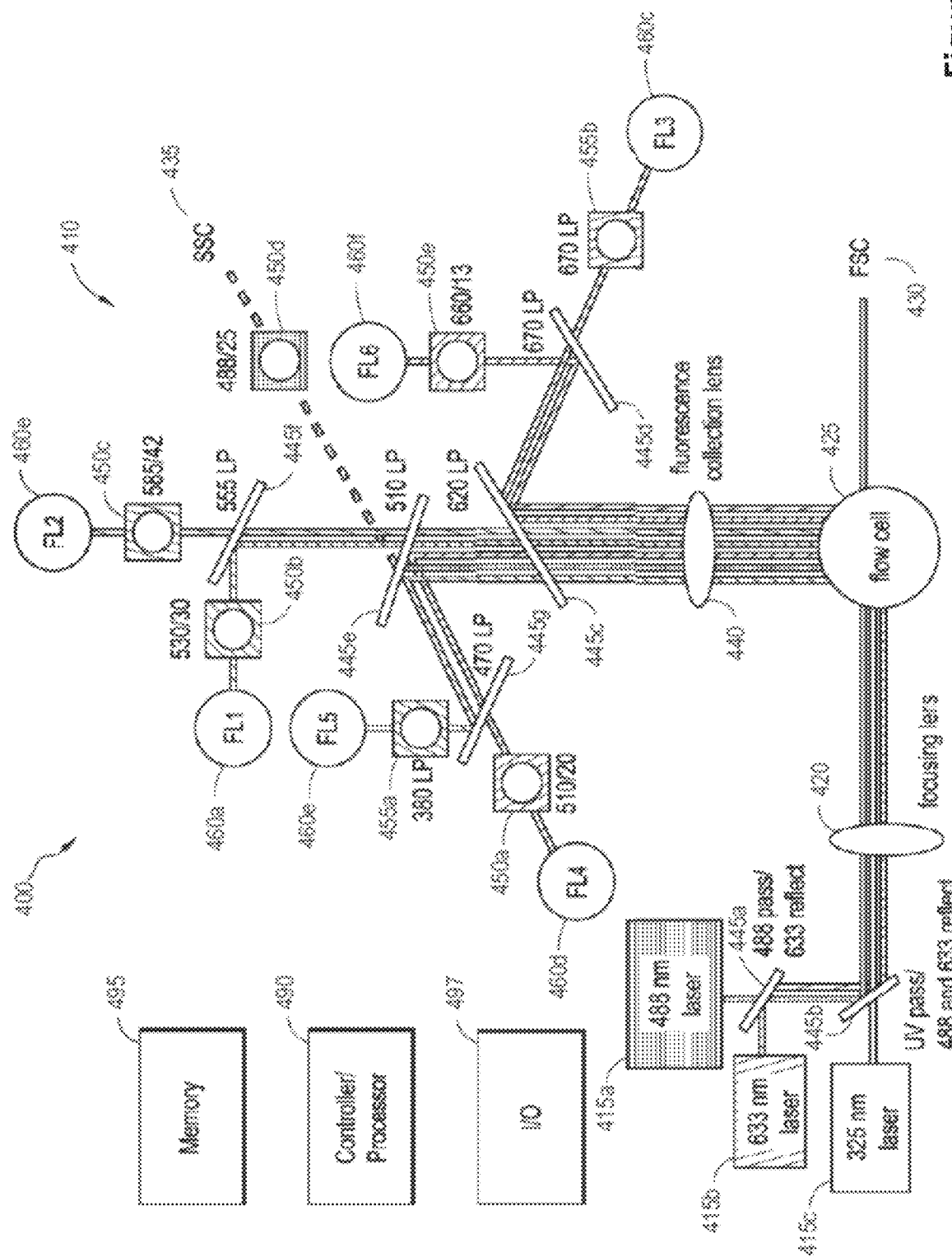
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
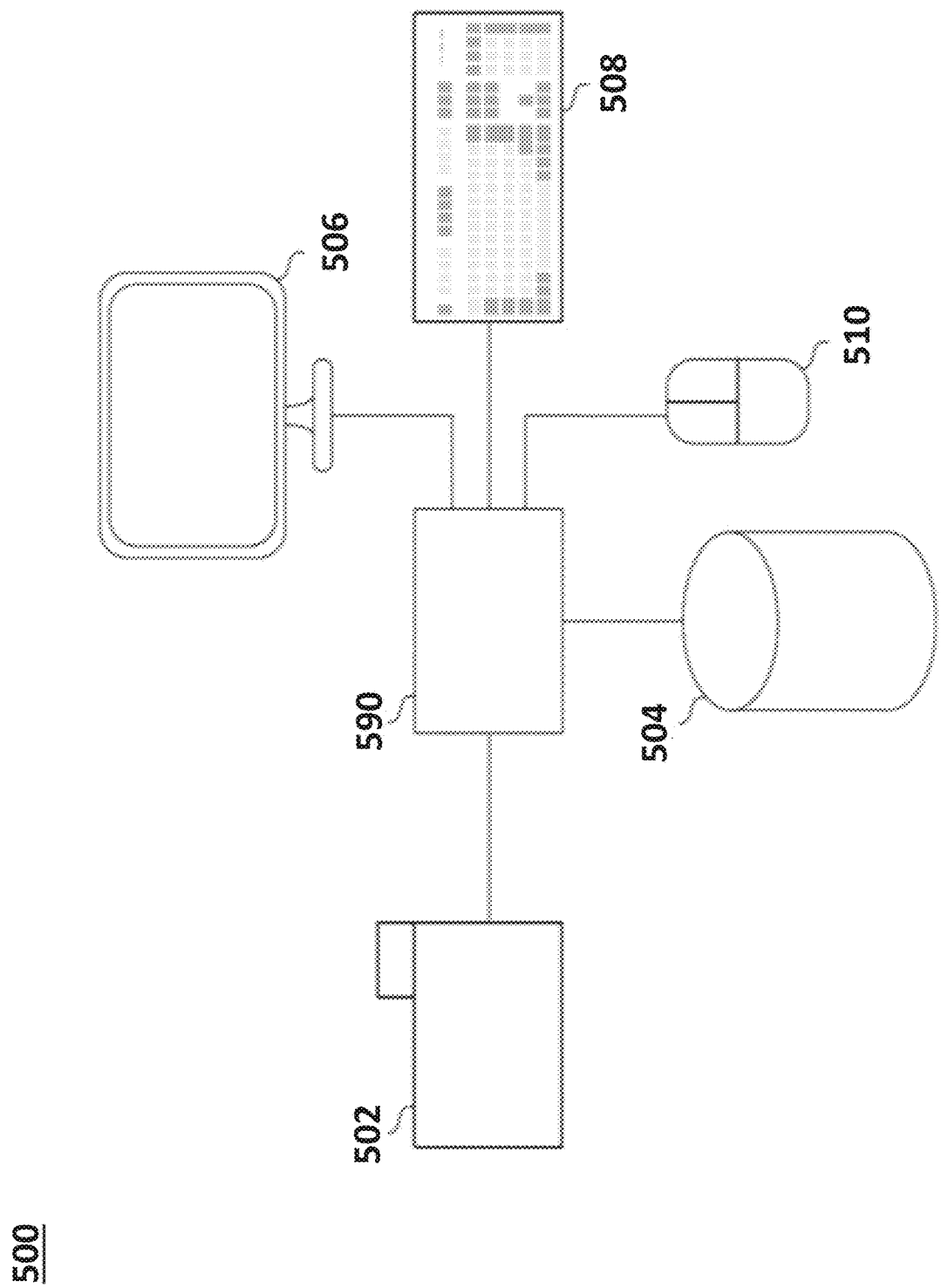
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer 502 can be configured to acquire biological event data. For example, a flow cytometer can generate flow cytometric event data. The particle analyzer 502 can be configured to provide biological event data to the analytics controller 500. A data communication channel can be included between the particle analyzer 502 and the analytics controller 500. The biological event data can be provided to the analytics controller 500 via the data communication channel.

The analytics controller 500 can be configured to receive biological event data from the particle analyzer 502. The biological event data received from the particle analyzer 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Computer-Controlled Systems

Aspects of the present disclosure further include computer controlled systems for practicing the subject methods, where the systems further include one or more computers for complete automation or partial automation of a system for practicing methods described herein. In some embodiments, systems include a computer having a computer readable storage medium with a computer program stored thereon, where the computer program when loaded on the computer includes instructions for irradiating an acousto-optic device with a laser to generate an output laser beam having a plurality of angularly deflected laser beams, instructions for determining an intensity profile of the output laser beam along a horizontal axis and instructions for adjusting one or more parameters of a waveform inputted into the acousto-optic device in response to the determined intensity profile to generate an output laser beam having a modulated intensity profile. In certain embodiments, the computer program includes instructions for capturing an image of the intensity profile of the output laser beam along a horizontal axis and instructions for determining an intensity profile based on the captured image.

In embodiments, the system includes an input module, a processing module and an output module. In some embodiments, the subject systems may include an input module for inputting parameters or information about the acousto-optic device (e.g., acousto-optic deflector), the laser, the waveform generator, the sample, intensity and wavelengths (discrete or ranges) of the applied light source, flow cell diameter, number of light channels, number of detection regions, duration of irradiation by the light source, number of different light sources, distance from light source to the flow channel, focal length of any optical adjustment components, refractive index of flow channel medium (e.g., sheath fluid), presence of any wavelength separators, properties of wavelength separators including bandpass width, opacity, grating spacing as well as properties and sensitivity of the photodetectors.

After the processing module has performed one or more of the steps of the subject methods, an output module communicates the results to the user, such as by displaying on a monitor or by printing a report.

The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods, such as irradiating an acousto-optic device with a laser to generate an output laser beam having a plurality of angularly deflected laser beams, capturing an image of the intensity profile of the output laser beam and adjusting the tones of waveforms inputted into the acousto-optic device for each angularly deflected laser beam to have substantially the same amplitude.

The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor of the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid state storage devices (including magnetic or optical disks or tape or RAM, or any other suitable device, either fixed or portable). The processor may include a general purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

Figure 6:
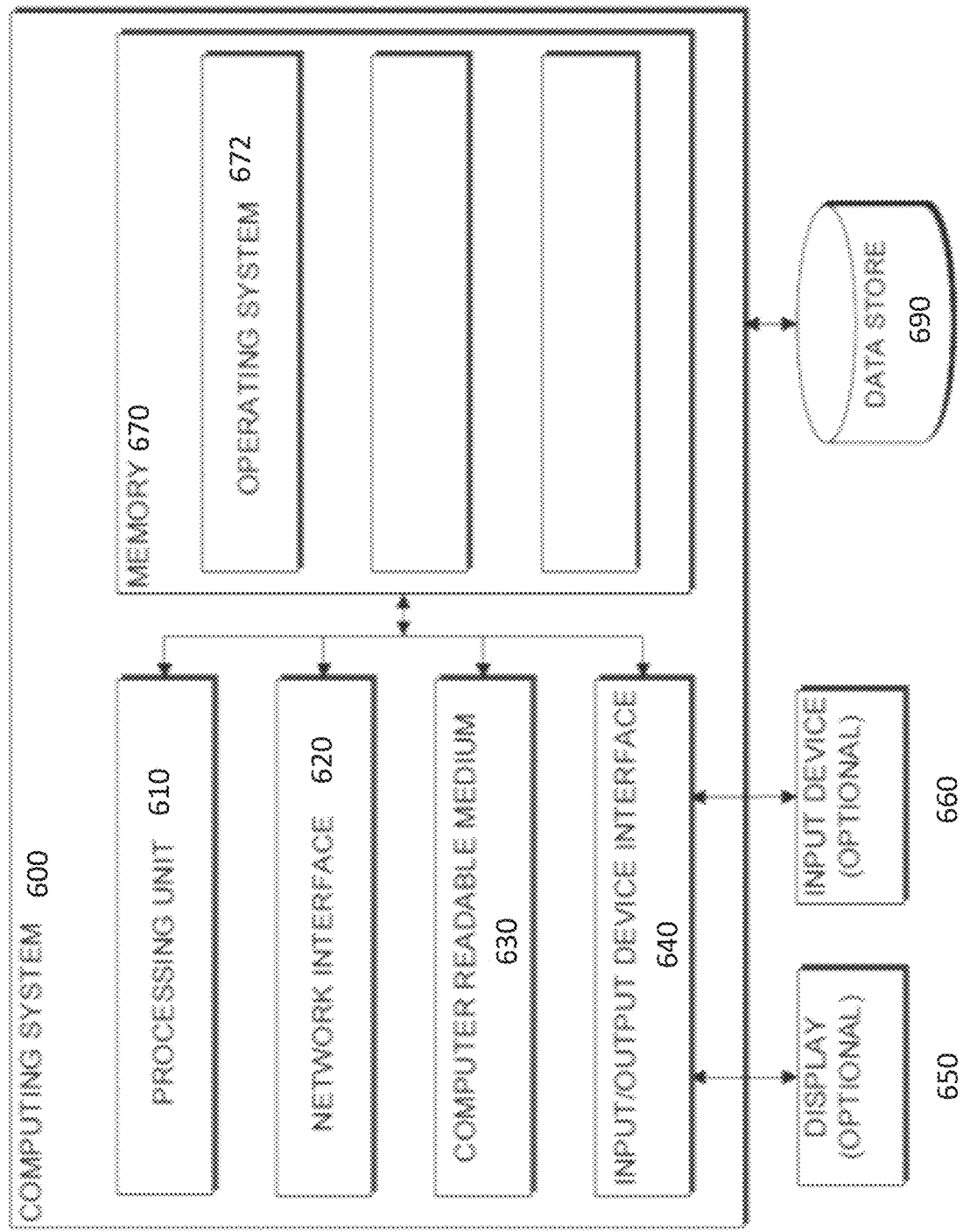
FIG. 6 depicts a block diagram of a computing system according to certain embodiments.

FIG. 6 depicts a general architecture of an example computing device 600 according to certain embodiments. The general architecture of the computing device 600 depicted in FIG. 6 includes an arrangement of computer hardware and software components. The computing device 600 may include many more (or fewer) elements than those shown in FIG. 6. It is not necessary, however, that all of these generally conventional elements be shown in order to provide an enabling disclosure. As illustrated, the computing device 600 includes a processing unit 610, a network interface 620, a computer readable medium drive 630, an input/output device interface 640, a display 650, and an input device 660, all of which may communicate with one another by way of a communication bus. The network interface 620 may provide connectivity to one or more networks or computing systems. The processing unit 610 may thus receive information and instructions from other computing systems or services via a network. The processing unit 610 may also communicate to and from memory 670 and further provide output information for an optional display 650 via the input/output device interface 640. The input/output device interface 840 may also accept input from the optional input device 660, such as a keyboard, mouse, digital pen, microphone, touch screen, gesture recognition system, voice recognition system, gamepad, accelerometer, gyroscope, or other input device.

The memory 670 may contain computer program instructions (grouped as modules or components in some embodiments) that the processing unit 610 executes in order to implement one or more embodiments. The memory 670 generally includes RAM, ROM and/or other persistent, auxiliary or non-transitory computer-readable media. The memory 670 may store an operating system 672 that provides computer program instructions for use by the processing unit 610 in the general administration and operation of the computing device 600. The memory 670 may further include computer program instructions and other information for implementing aspects of the present disclosure.

Non-Transitory Computer-Readable Storage Medium

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the methods described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, Wash.), and C++ (AT&T Corp., Bedminster, N.J.), as well as any many others.

In some embodiments, computer readable storage media of interest include a computer program stored thereon, where the computer program when loaded on the computer includes instructions having algorithm for irradiating an acousto-optic device with a laser to generate an output laser beam having a plurality of angularly deflected laser beams, algorithm for detecting scattered light from the particle with a photodetector, algorithm for determining an intensity profile of the output laser beam along a horizontal axis and algorithm for adjusting one or more parameters of a waveform inputted into the acousto-optic device in response to the determined intensity profile to generate an output laser beam having a modulated intensity profile. In some embodiments, the non-transitory computer readable storage medium includes algorithm for capturing an image of the intensity profile of the output laser beam along a horizontal axis and instructions for determining an intensity profile based on the captured image.

In some embodiments, the non-transitory computer readable storage medium includes algorithm for determining an intensity profile of the output laser beam includes generating an intensity profile plot of the plurality of angularly deflected laser beams along a horizontal axis. In generating the intensity profile plot, methods may include determining an intensity value from each angularly deflected laser beam and plotting each intensity value with respect to the position of the angularly deflected laser beam along the horizontal axis. In some instances, the non-transitory computer readable storage medium includes algorithm for determining the intensity value based on the amplitude of the angularly deflected laser beam along the horizontal axis. In other instances, the non-transitory computer readable storage medium includes algorithm for determining the intensity value based on the brightness of pixels generated by each angularly deflected laser beam in a captured image of the output laser beam. In some embodiments, each intensity value plotted in the intensity profile plot is based on a single measurement of the output laser beam. In other embodiments, the non-transitory computer readable storage medium includes algorithm for plotting each intensity value based on an average intensity of each angularly deflected laser beam over a predetermined time period of irradiation.

In certain embodiments, the non-transitory computer readable storage medium includes algorithm for assessing the intensity profile of the output laser beam and determining whether one or more adjustments are needed to generate an output laser beam having a desired intensity profile. In some instances, the non-transitory computer readable storage medium includes algorithm for identifying one or more of the angularly deflected laser beams of the output laser beams for adjustment.

In some embodiments, the non-transitory computer readable storage medium includes algorithm for adjusting the intensity of one or more of the angularly deflected laser beams in a manner such that two or more angularly deflected laser beams in the output laser beam have the same intensity. In some embodiments, the non-transitory computer readable storage medium includes algorithm for adjusting the intensity of one or more of the angularly deflected laser beams in a manner such that the plurality of angularly deflected laser beams of the output laser beam have intensities which vary between each other by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less and including by 0.001% or less. In some embodiments, the non-transitory computer readable storage medium includes algorithm for adjusting the intensity of one or more of the angularly deflected laser beams in a manner such that the output laser beam exhibits a top-hat beam profile along a horizontal axis.

In some embodiments, the non-transitory computer readable storage medium includes algorithm for adjusting a parameter of waveforms inputted into the acousto-optic device. In some instances, the non-transitory computer readable storage medium includes algorithm for adjusting one or more tones of the waveform inputted for each of the identified angularly deflected laser beams. In certain instances, the non-transitory computer readable storage medium includes algorithm for adjusting the amplitude of the tones of the waveforms inputted for each of the identified angularly deflected laser beams. In other instances, the non-transitory computer readable storage medium includes algorithm for adjusting the frequency of the tones of the waveforms inputted for each of the identified angularly deflected laser beams. In certain embodiments, the non-transitory computer readable storage medium includes algorithm for adjusting the tones of waveforms inputted into the acousto-optic device for each angularly deflected laser beam to have substantially the same amplitude. In some embodiments, the non-transitory computer readable storage medium includes algorithm for adjusting the sine waves which form each tone to have substantially the same frequency.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Aspects of the invention further include kits, where kits include one or more lasers, an acousto-optic device (e.g., an acousto-optic deflector), a waveform generator and an imaging sensor. In some embodiments, the imaging sensor is a camera. In some instances, kits include an arbitrary waveform generator. Kits may further include one or more optical adjustment components, such as a beam splitter, lens systems or a beam inverter as described herein. The various assay components of the kits may be present in separate containers, or some or all of them may be pre-combined. For example, in some instances, one or more components of the kit, e.g., each detector is present in a sealed pouch, e.g., a sterile foil pouch or envelope.

In addition to the above components, the subject kits may further include (in certain embodiments) instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods, and computer systems find use in a variety of applications where it is desirable to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject systems provide fully automated protocols so that adjustments to a flow cytometer during use require little, if any human input.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method for modulating an intensity profile of a laser in a particle analyzer, the method comprising:
   irradiating an acousto-optic device with a laser to generate an output laser beam comprising a plurality of angularly deflected laser beams;
   capturing an image of the output laser beam;
   determining an intensity profile of the output laser beam along a horizontal axis from the captured image; and
   adjusting one or more parameters of a waveform inputted into the acousto-optic device in response to the determined intensity profile to generate an output laser beam having a modulated intensity profile.

2. The method according to claim 1, wherein the method comprises adjusting one or more tones of the inputted waveform.

3. The method according to claim 2, wherein each tone of the inputted waveform comprises one or more sine waves.

4. The method according to claim 2, wherein the method comprises adjusting an amplitude of the one or more tones of the inputted waveform.

5. The method according to claim 1, wherein the method further comprises:
   determining an amplitude of each angularly deflected laser beam in the output laser beam;
   adjusting one or more parameters of the waveform inputted into the acousto-optic device for each angularly deflected laser beam.

6. The method according to claim 5, wherein the method comprises adjusting the amplitude of the tone of the inputted waveform for each angularly deflected laser beam.

7. The method according to claim 5, wherein the method comprises adjusting the frequency of the tone of the inputted waveform for each angularly deflected laser beam.

8. The method according to claim 1, wherein one or more parameters of the inputted waveform are adjusted to generate an output laser beam having a substantially constant intensity profile along a horizontal axis.

9. The method according to claim 8, wherein one or more parameters of the inputted waveform are adjusted to generate a plurality of angularly deflected laser beams having intensities which vary by 10% or less.

10. The method according to claim 8, wherein one or more parameters of the inputted waveform are adjusted to generate a plurality of angularly deflected laser beams having intensities which vary by 5% or less.

11. The method according to claim 1, wherein the method further comprises generating an intensity profile plot from the captured image of the output laser beam.

12. The method according to claim 1, wherein the acousto-optic device is an acousto-optic deflector.

13. The method according to claim 1, wherein each waveform inputted into the acousto-optic device is generated with an Arbitrary Waveform Generator (AWG).

14. The method according to claim 1, wherein the plurality of angularly deflected laser beams comprise a local oscillator (LO) beam and a plurality of radiofrequency comb beams.

15. The method according to claim 1, wherein the plurality of angularly deflected laser beams are spatially separated.

16. The method according to claim 15, wherein the each angularly deflected laser beam at least partially overlaps with one other angularly deflected laser beam in the output laser beam.

17. The method according to claim 1, wherein the particle analyzer is part of a flow cytometer.

18. A particle analyzer comprising:
   a laser;
   an acousto-optic device;
   a waveform generator configured to input a waveform into the acousto-optic device to generate an output laser beam comprising a plurality of angularly deflected laser beams;
   an imaging photosensor; and
   a controller comprising a processor having memory operably coupled to the processor wherein the memory comprises instructions stored thereon, which when executed by the processor, cause the processor to:
      capture an image of the output laser beam with the imaging photosensor;
      determine an intensity profile of the output laser beam along a horizontal axis from the captured image; and
      adjust one or more parameters of a waveform inputted into the acousto-optic device in response to the determined intensity profile to generate an output laser beam having a modulated intensity profile.

19. The particle analyzer according to claim 18, wherein the acousto-optic device is an acousto-optic deflector.

20. The particle analyzer according to claim 18, wherein the imaging photosensor is a camera.

* * * * *